United States Patent
Byun et al.

(10) Patent No.: US 12,253,703 B2
(45) Date of Patent: Mar. 18, 2025

(54) REDDENING-RESISTANT LAYER

(71) Applicant: LG CHEM, LTD., Seoul (KR)

(72) Inventors: Jin Seok Byun, Daejeon (KR); Yeong Rae Chang, Daejeon (KR); Na Young Shin, Daejeon (KR); Jae Hoon Shim, Daejeon (KR); Kyun Il Rah, Daejeon (KR)

(73) Assignee: LG Chem, Ltd., Seoul (KR)

( * ) Notice: Subject to any disclaimer, the term of this patent is extended or adjusted under 35 U.S.C. 154(b) by 796 days.

(21) Appl. No.: 17/441,675

(22) PCT Filed: Jan. 31, 2020

(86) PCT No.: PCT/KR2020/001471
§ 371 (c)(1),
(2) Date: Sep. 21, 2021

(87) PCT Pub. No.: WO2020/204340
PCT Pub. Date: Oct. 8, 2020

(65) Prior Publication Data
US 2022/0146729 A1 May 12, 2022

(30) Foreign Application Priority Data
Mar. 29, 2019 (KR) .................. 10-2019-0037454

(51) Int. Cl.
G02B 1/10 (2015.01)
C08J 5/18 (2006.01)
C08K 7/22 (2006.01)
G02B 5/30 (2006.01)
B32B 3/26 (2006.01)
(Continued)

(52) U.S. Cl.
CPC ............ *G02B 5/305* (2013.01); *C08J 5/18* (2013.01); *C08K 7/22* (2013.01); *B32B 3/26* (2013.01); *C08J 2333/00* (2013.01); *C08K 7/26* (2013.01); *C08K 2201/003* (2013.01); *G02B 1/10* (2013.01); *G02B 1/11* (2013.01); *G02B 5/30* (2013.01); *G02B 2207/107* (2013.01)

(58) Field of Classification Search
CPC ............ G02B 5/305; G02B 5/30; G02B 1/10; G02B 1/11; G02B 2207/107; C08J 5/18; C08J 2333/00; C08K 7/22; C08K 7/26; C08K 2201/003; B32B 3/26
USPC ................................................. 428/1.1, 1.3
See application file for complete search history.

(56) References Cited

U.S. PATENT DOCUMENTS

| | | | |
|---|---|---|---|
| 4,908,054 A | 3/1990 | Jones et al. | |
| 2017/0131439 A1* | 5/2017 | Kobori | .......... C08J 7/18 |
| 2018/0231687 A1 | 8/2018 | Byun et al. | |

FOREIGN PATENT DOCUMENTS

| | | |
|---|---|---|
| CN | 102656486 A | 9/2012 |
| CN | 104871035 A | 8/2015 |
| JP | 2005-321593 A | 11/2005 |

(Continued)

*Primary Examiner* — Ruiyun Zhang
(74) *Attorney, Agent, or Firm* — Bryan Cave Leighton Paisner LLP

(57) ABSTRACT

The present application relates to an optical laminate or a reddening-resistant layer. The present application can provide an optical laminate that does not cause a so-called reddening phenomenon even when driven or maintained under extremely harsh conditions (e.g., very high temperature conditions), or a reddening-resistant layer applied thereto.

12 Claims, 3 Drawing Sheets

(51) Int. Cl.
 *C08K 7/26* (2006.01)
 *G02B 1/11* (2015.01)

(56) References Cited

FOREIGN PATENT DOCUMENTS

| | | | |
|---|---|---|---|
| JP | 2008-081728 A | 4/2008 | |
| JP | 2018-533762 A | 11/2018 | |
| JP | 2019-028196 A | 2/2019 | |
| KR | 10-1990-0012854 A | 9/1990 | |
| KR | 10-2005-0036458 A | 4/2005 | |
| KR | 10-2006-111622 A | 10/2006 | |
| KR | 10-2009-0115028 A | 11/2009 | |
| KR | 10-2015-0113907 A | 10/2015 | |
| KR | 10-2015-0143617 A | 12/2015 | |
| KR | 10-2017-0126138 A | 11/2017 | |
| KR | 10-2017-0130780 A | 11/2017 | |
| KR | 10-2018-0033016 A | 4/2018 | |
| KR | 10-2018-0111749 A | 10/2018 | |
| KR | 10-2018-0131206 A | 12/2018 | |
| KR | 10-2018-0132302 A | 12/2018 | |
| KR | 20180132302 | * | 12/2018 |
| TW | 201816434 A | 5/2018 | |
| TW | 201910824 A | 3/2019 | |

* cited by examiner

REDDENING-RESISTANT LAYER

CROSS-REFERENCE TO RELATED APPLICATIONS

This application is a National Phase entry pursuant to 35 U.S.C. § 371 of International Application No. PCT/KR2020/001471, filed Jan. 31, 2020, and claims the benefit of and priority to Korean Patent Application No. 10-2019-0037454, filed on Mar. 29, 2019, the disclosures of which are incorporated by reference in their entirety for all purposes as if fully set forth herein.

TECHNICAL FIELD

The present application relates to a reddening-resistant layer and an optical laminate comprising the same.

BACKGROUND ART

Increasingly, display devices are driven and/or maintained in harsher conditions. For example, display devices used for navigation devices, or vehicle displays such as vehicle dashboards are maintained and/or driven at a very high temperature in summer.

Depending on the use of the display device, an optical laminate such as a polarizing plate may be used in contact with a glass substrate called a cover glass. Generally, the cover glass or the like has excellent thermal conductive characteristics as compared to the optical laminate. Thus, heat is better transferred to the optical laminate in contact with the cover glass.

Accordingly, the optical laminate such as the polarizing plate is also required to maintain durability under much harsher conditions than conventional ones (particularly, conditions maintained at a significantly higher temperature than conventional ones).

DISCLOSURE

Technical Problem

The present application provides a reddening-resistant layer, an optical laminate and a display device.

Technical Solution

Among physical properties referred to in this specification, the physical properties that the measurement temperature and/or the measurement pressure affect the results are the results measured at room temperature and/or normal pressure, unless otherwise specified.

The term room temperature is a natural temperature without warming and cooling, which means, for example, any one temperature in a range of 10° C. to 30° C., or a temperature of 23° C. or about 25° C. or so. In this specification, the unit of temperature is ° C., unless otherwise specified.

The term normal pressure is a natural pressure without pressurizing and depressurizing, which means, usually, about 1 atm or so of atmospheric pressure.

In this specification, the physical properties in which the measurement humidity affects the results are physical properties measured at natural humidity which is not separately controlled at the room temperature and normal pressure state, unless otherwise specified.

The present application relates to an optical laminate, a display device or a reddening-resistant layer. The optical laminate or display device may comprise the reddening-resistant layer. In the present application, the term reddening-resistant layer may mean all kinds of layers that they are applied to various optical laminates including optical functional layers to be capable of preventing, alleviating, reducing, suppressing and/or delaying the reddening of the optical laminates or the optical functional layers applied to the optical laminates. In particular, even when the optical functional layer, which is very weak to heat, such as a polarizing layer to be described below (in particular, an iodine-based polarizing layer) is used and maintained under extremely harsh conditions such as a high temperature, the reddening-resistant layer may effectively prevent, alleviate, reduce, suppress and/or delay the reddening of the optical functional layer.

The reddening means a phenomenon in which the optical laminate or the optical functional layer changes red. The occurrence of reddening can be confirmed, for example, through the a* value of the so-called CIE L*a*b* color space. In the CIE L*a*b* color space, the increase of the a* value in the positive direction means that the object becomes redder. In addition, it means that as the absolute value of the a* value in the negative direction increases, the object becomes greener. Therefore, the fact that the a* value change of the optical functional layer or the optical laminate increases in the positive direction relative to the initial a* value means that the optical functional layer or the optical laminate has been reddened.

In the present application, the term reddening-resistant layer may mean all kinds of layers that they are applied to optical laminates or applied together with optical functional layers to be capable of preventing, alleviating, reducing, suppressing and/or delaying the a* value change or increase of the optical laminates and/or the optical functional layers in a positive direction.

The reddening easily occurs mainly when heat is applied to the optical laminate and/or the optical functional layer, and therefore, the reddening occurs easily as the optical laminate and/or the optical functional layer is maintained at a high temperature.

In the present application, the term reddening-resistant layer may refer to a layer that after a heat-proof test the optical laminate or the optical functional layer may have an absolute value of 2 or less in the a* value change amount. The heat-proof test means a test for maintaining the optical laminate and/or the optical functional layer at about 95° C. for about 750 hours or so or at about 105° C. for about 250 hours. The a* value change amount may be a value $(a^*_a - a^*_i)$ obtained by subtracting the a* value (initial a* value) $(a^*_i)$ before the heat-proof test from the a* value $(a^*_a)$ after the heat-proof test, or conversely, may be a value $(a^*_i, a^*_a)$ obtained by subtracting the a* value $(a^*_a)$ after the heat-proof test from the initial a* value (the $a^*_i$). In light of the purpose of the reddening-resistant layer, the a* value change amount may be a value $(a^*_a - a^*_i)$ obtained by subtracting the initial a* value $(a^*_i)$ from the a* value $(a^*_a)$ after the heat-proof test.

The heat-proof test may be a heat-proof test performed under harsher conditions than a usual heat-proof test. For example, the heat-proof test may be a heat-proof test performed in a state where the upper and lower surfaces (for example, the upper whole surface and lower whole surface) of the optical laminate and/or the optical functional layer are in contact with a glass substrate. The glass substrate is a material that heat transfer is generally good as compared with an optical laminate or an optical functional layer, and thus when the heat-proof test is performed in a state of being in contact with the glass substrate, the influence of the applied heat on the optical laminate and/or the optical functional layer becomes larger. The type of glass substrate applied to the heat-proof test is not particularly limited, but in this specification, it is based on the application of a soda lime glass substrate having a thickness of approximately 1.1 mm. The glass substrate is generally known to have a thermal conductivity of about 0.6 W/mK to 1.38 W/mK, where the optical laminate or optical functional layer of the present application can prevent, alleviate, reduce, suppress and/or delay the reddening even when the heat-proof test is performed in a state that the glass substrate having a high thermal conductivity as above is in contact therewith. Color coordinates and/or transmittance values related to the heat-proof test referred to herein are based on the application of a soda lime glass having a thickness of 1.1 mm or so, where in the heat-proof test, the contact may mean a state that the optical functional layer or the optical laminate comprising the same is in direct contact with the glass substrate (soda lime glass plate having a thickness of 1.1 mm or so).

The optical laminate of this application may comprise an optical functional layer; and the reddening-resistant layer formed on at least one surface of the optical functional layer. As the optical laminate comprises the reddening-resistant layer, the reddening of the optical laminate or the optical functional layer can be prevented, alleviated, reduced, suppressed and/or delayed.

For example, for the optical laminate or the optical functional layer included therein the absolute value of the change amount ($\Delta a^*$) in color coordinate $a^*$ values of CIE $L^*_a{}^*b^*$ according to Equation 1 below after a heat-proof test may be within 2. The color coordinates referred to in the present application are the results measured using a JASCO V-7100 spectrophotometer.

$$\Delta a^* = a^*_a - a^*_i \quad \text{[Equation 1]}$$

In Equation 1, $\Delta a^*$ is the change amount of the color coordinate $a^*$, $a^*_a$ is the color coordinate $a^*$ value after the heat-proof test, and $a^*_i$ is the color coordinate $a^*$ value (initial $a^*$ value) before the heat-proof test.

In another example, the absolute value of the change amount ($\Delta a^*$) may also be within about 1.9, within about 1.8, within about 1.7, within about 1.6, within about 1.5, within about 1.4, within about 1.3, within about 1.2, within about 1.1, within about 1.0, within about 0.9, within about 0.8, within about 0.7, within about 0.6, within about 0.5, within about 0.4, within about 0.3, within about 0.2, or within about 0.1. The lower limit value is not limited because the absolute value of the change amount ($\Delta a^*$) means that the lower the value, the less the reddening occurs. In one example, the absolute value of the change amount ($\Delta a^*$) may be 0 or more. In an example, the absolute value of the change amount ($\Delta a^*$) may be a change amount when the $a^*$ value changes in the positive direction as compared to the initial stage.

The heat-proof test is a process of maintaining the optical laminate and/or the optical functional layer at about 95° C. for about 750 hours or so, or at about 105° C. for about 250 hours, as described above. This heat-proof test can be performed in a state where the upper surface and the lower surface (upper whole surface and lower whole surface) of the relevant optical laminate and/or optical functional layer are in contact with the glass substrate (soda lime glass plate having a thickness of 1.1 mm or so). The contact may be a direct contact. This $a^*$ value change amount can be measured in the manner described in the examples herein.

When the reddening occurs in the optical laminate and/or the optical functional layer, a phenomenon, in which the transmittance is usually lowered, appears. Since the optical laminate of the present application has excellent resistance to the reddening, the change in transmittance is also absent or minimized.

For example, in the same heat-proof test as for confirming Equation 1, for the optical laminate or the optical functional layer, the absolute value of the change amount ($\Delta Ts$) in the transmittance according to Equation 2 below (single transmittance when the optical laminate is a polarizing plate or the optical functional layer is a polarizing layer) may be within 5. The transmittance is the result measured for light in the visible light region, for example, light in the range of approximately 380 nm to 780 nm using a JASCO V-7100 spectrophotometer.

$$\Delta Ts = T_a - T_i \quad \text{[Equation 2]}$$

In Equation 2, $\Delta Ts$ is the change amount in the transmittance (single transmittance when the optical laminate is a polarizing plate or the optical functional layer is a polarizing layer), $T_a$ is the transmittance after the heat-proof test (single transmittance when the optical laminate is a polarizing plate or the optical functional layer is a polarizing layer) (transmittance after the heat-proof endurance test), and $T_i$ is the transmittance before the heat-proof test (single transmittance when the optical laminate is a polarizing plate or the optical functional layer is a polarizing layer).

In another example, the absolute value of the change amount ($\Delta Ts$) may be about 4.9 or less, about 4.8 or less, about 4.7 or less, about 4.6 or less, about 4.5 or less, about 4.4 or less, about 4.3 or less, about 4.2 or less, about 4.1 or less, about 4 or less, about 3.9 or less, about 3.8 or less, about 3.7 or less, about 3.6 or less, about 3.5 or less, about 3.4 or less, about 3.3 or less, about 3.2 or less, about 3.1 or less, about 3 or less, about 2.9 or less, about 2.8 or less, about 2.7 or less, about 2.6 or less, about 2.5 or less, about 2.4 or less, about 2.3 or less, about 2.2 or less, about 2.1 or less, about 1.9 or less, about 1.8 or less, about 1.7 or less, about 1.6 or less, about 1.5 or less, about 1.4 or less, about 1.3 or less, about 1.2 or less, about 1.1 or less, about 1.0 or less, about 0.9 or less, about 0.8 or less, about 0.7 or less, about 0.6 or less, about 0.5 or less, about 0.4 or less, about 0.3 or less, about 0.2 or less, or about 0.1 or less. The lower the change in the transmittance, the less the reddening, so that the lower limit of the absolute value of the change amount ($\Delta Ts$) is 0. In another example, the absolute value of such a change amount ($\Delta Ts$) may also be approximately more than 0.

The heat-proof test for measuring the transmittance change amount may be performed under the same conditions as those of the heat-proof test for measuring the $a^*$ value change amount. The transmittance can be measured in the manner described in the examples herein.

The optical laminate comprises an optical functional layer. The term optical functional layer is a layer that exhibits at least one optically intended function. An example of the optically intended function is generation of polarized light such as linearly polarized light or circularly polarized light, reflection, refraction, absorption, scattering and/or phase retardation. In the optical field, various layers having such functions are known, where as an example of the optical functional layer to be applied in the present application, all kinds of layers having a reddening problem among the known optical functional layers may be included.

In one example, the optical functional layer may be a polarizing layer or a retardation layer. In this specification, the case where the optical functional layer is a polarizing layer is described, but the kind of the optical functional layer is not limited to the polarizing layer. In addition, when the optical functional layer is a polarizing layer, the optical laminate may be a polarizing plate.

In this specification, the terms polarizing layer and polarizing plate refer to other objects. The term polarizing layer may refer to, for example, a multilayer or a monolayer exhibiting a polarizing function solely, and the polarizing plate may refer to a laminate comprising other elements having no polarizing function together with the polarizing layer. Here, other elements included together with the polarizing layer may be exemplified by a protective film or a protective layer of the polarizing layer, the reddening-resistant layer, a retardation layer, an adhesive layer, a pressure-sensitive adhesive layer, a hard coating layer or a low reflection layer, and the like, but is not limited thereto.

Basically, the type of the polarizing layer applied in the present application is not limited. A known most general polarizing layer is a linear absorbing polarizing layer, which is a so-called poly(vinyl alcohol) (hereinafter, may be referred to as PVA) polarizing layer. In this specification, the term PVA means polyvinyl alcohol or a derivative thereof, unless otherwise specified. As the PVA polarizing layer, for example, a stretched PVA film in which an anisotropic absorbent material such as iodine or a dichroic dye is adsorbed and oriented, or a so-called coating PVA polarizing layer, which is formed thinly by applying PVA to a coating method, and the like are known, but in the present application, all of the above-described polarizing layers may be applied. In addition to the PVA polarizing layer, a polarizing plate formed of a liquid crystal compound such as LLC (lyotropic liquid crystal), or a polarizing layer formed by aligning a polymerizable liquid crystal compound (so-called RM (reactive mesogen)) and a dichroic dye in a GH (guest-host) method, and the like may also be applied in the present application.

In the present application, in particular, even when an iodine-based polarizing layer is applied as the polarizing layer, the reddening of the iodine-based polarizing layer can be effectively prevented, alleviated, reduced, suppressed and/or delayed.

The iodine-based polarizing layer is a polarizing layer to which an iodine-based material is applied as the anisotropic absorbent material. Typically, as the anisotropic absorbent material, an iodine-based material may be applied, or a dichroic dye such as an azo dye may be applied. The former case may be called an iodine-based polarizing layer, and the latter case may be called a dye-based polarizing layer. In general, the iodine-based polarizing layer may exhibit excellent optical performance (for example, high transmittance, high polarization degree, and high contrast) as compared to the dye-based polarizing layer. However, the iodine-based polarizing layer has significantly lowered heat resistance as compared with the dye-based polarizing layer. In particular, the iodine-based material included in the iodine-based polarizing layer is decomposed under high temperature and/or high humidity conditions to easily generate $I_2$ materials, which cause reddening through inappropriate absorption of the visible light region. Therefore, in applications where durability in high temperature and/or high humidity conditions is necessarily required, the dye-based polarizing layer is sometimes applied even if the loss of optical characteristics is taken. However, according to the present application, even when the iodine-based polarizing layer is applied, furthermore, even when such an iodine-based polarizing layer is maintained and used under harsh conditions such as significantly high temperature conditions, the reddening of the iodine-based polarizing layer can be effectively prevented, alleviated, reduced, suppressed and/or delayed. Therefore, according to the present application, while the disadvantages of the iodine-based polarizing layer are solved, the advantages can be taken.

The iodine-based polarizing layer may be an iodine-based PVA polarizing layer. The iodine-based PVA polarizing layer is a polarizing layer in which an iodine-based material is oriented in the stretched PVA film or the coating PVA polarizing layer.

According to the present application, even when the iodine-based polarizing layer having weak durability as above is applied, it is possible to take the advantages of the polarizing layer while effectively preventing the reddening phenomenon, but the kind of polarizing layer applied in the present application is not limited to the iodine-based polarizing layer.

The polarizing layer applied in the examples of the present application is an iodine-based PVA polarizing layer, and such a polarizing layer is usually produced by dyeing and stretching a PVA disc film. In the production process of the PVA polarizing layer, optionally, additional processes such as swelling, crosslinking, washing and/or complementary color processes may also be performed, and a process of producing the PVA polarizing layer through such processes is well known.

In one example, as the polarizing layer, an iodine-based PVA polarizing layer comprising a zinc component may be used, in order to secure durability, particularly, high temperature reliability of the optical laminate. Here, the zinc component is exemplified by zinc and/or zinc ions, and the like. The PVA polarizing layer may also comprise a potassium component such as potassium or potassium ions as an additional component. If the polarizing layer containing such components is used, an optical laminate, in which durability is maintained stably even at high temperature conditions, can be provided.

The ratio of the potassium and/or zinc component can be further adjusted. For example, in one example, the ratio (K/Zn) of the potassium component (K) and the zinc component (Zn) included in the PVA polarizing layer may be in a range of 0.2 to 8. In another example, the ratio (K/Zn) may be about 0.4 or more, 0.6 or more, 0.8 or more, 1 or more, 1.5 or more, 2 or more, or 2.5 or more, and may be 7.5 or less, 7 or less, 6.5 or less, 6 or less, 5.5 or less, about 5 or less, about 4.5 or less, or about 4 or less. The ratio may be a molar ratio or a weight ratio.

The content of the potassium component included in the PVA polarizing layer may be about 0.1 to 2 weight %. In another example, the ratio of the potassium component may be about 0.15 weight % or more, about 0.2 weight % or more, about 0.25 weight % or more, about 0.3 weight % or more, about 0.35 weight % or more, 0.4 weight % or more, or about 0.45 weight % or more, about 0.5 weight % or more, about 0.55 weight % or more, about 0.6 weight % or more, about 0.65 weight % or more, about 0.7 weight % or more, about 0.75 weight % or more, or about 0.8 weight % or more, and may be about 1.95 weight % or less, about 1.9 weight % or less, about 1.85 weight % or less, about 1.8 weight % or less, about 1.75 weight % or less, about 1.7 weight % or less, about 1.65 weight % or less, about 1.6 weight % or less, about 1.55 weight % or less, about 1.5 weight % or less, about 1.45 weight % or less, about 1.4 weight % or less, about 1.35 weight % or less, about 1.3 weight % or less, about 1.25 weight % or less, about 1.2 weight % or less, about 1.15 weight % or less, about 1.1 weight % or less, about 1.05 weight % or less, about 1 weight % or less, about 0.95 weight % or less, about 0.9 weight % or less, or about 0.85 weight % or less or so.

In one example, the ratio of the potassium component and the zinc component may be included to satisfy Equation 3 below.

$$0.70 \text{ to } 1 = 1/(1+0.025 d/R) \qquad \text{[Equation 3]}$$

In Equation 3, d is the thickness (μm) of the PVA polarizing layer, and R is the ratio (K/Zn) of the weight ratio (K, unit:weight %) of the potassium component and the weight ratio (Zn, unit:weight %) of the zinc component contained in the polarizing layer.

By comprising potassium and zinc components in the polarizing layer, a polarizing layer having excellent reliability at high temperature can be provided.

In another example, the value of $1/(1+0.025 \text{ d/R})$ in Equation 3 may also be about 0.75 or more, 0.8 or more, or 0.85 or more, and the value of $1/(1+0.025 \text{ d/R})$ may also be about 0.97 or less, about 0.95 or less, or about 0.93 or less or so.

In the above-described details, the content of potassium and/or zinc components may be measured in the manner described in the examples herein.

The polarizing layer applied in examples of the present application may be a polarizing layer produced according to a known method for producing a polarizing layer. In addition, in the present application, when the polarizing layer comprising the potassium and/or zinc component is intended to be applied as the polarizing layer, it may be produced by controlling process conditions in the known process for producing a polarizing layer such that zinc and/or potassium may be included in the polarizing layer.

As described above, the PVA polarizing layer is usually produced by dyeing and stretching a PVA film (disc film), where optionally, swelling, crosslinking, washing and/or complementary color processes may be further performed in the production process of the PVA polarizing layer. The stretching process may be performed in a separate process, or may also be performed simultaneously with other processes such as dyeing, swelling and/or crosslinking. In such a production process, a treatment solution such as a dyeing solution, a crosslinking solution, a swelling solution, a washing solution and/or a complementary color solution is applied, where by controlling the components of this treatment solution, it may be determined whether the potassium and/or zinc components are included, or the ratio and the like may be adjusted.

In the dyeing process, the anisotropic absorbent material may be adsorbed and/or oriented to the PVA film. Such a dyeing process may be performed together with the stretching process, if necessary. The dyeing may be performed by immersing the film in a solution containing an anisotropic absorbent material, for example, an iodine solution. As the iodine solution, an aqueous solution or the like containing iodide ions by iodine ($I_2$) and a iodinated compound which is a solubilizing agent may be used. As the iodinated compound, for example, potassium iodide, lithium iodide, sodium iodide, zinc iodide, aluminum iodide, lead iodide, copper iodide, barium iodide, calcium iodide, tin iodide or titanium iodide, and the like may be used. The concentration of iodine and/or iodide ions in the iodine solution may be adjusted in consideration of the desired optical characteristics of the polarizing layer, and such an adjustment manner is known. Typically, the content of iodine in the dyeing solution (iodine solution) may be about 0.01 to 5 weight % or so, and the concentration of the iodinated compound may be about 0.01 to 10 weight % or so. In another example, the iodine content may be 0.05 weight % or more, 0.1 weight % or more, or 0.15 weight % or more, and may also be 4.5 weight % or less, 4 weight % or less, 3.5 weight % or less, 3 weight % or less, 2.5 weight % or less, 2 weight % or less, 1.5 weight % or less, 1 weight % or less, or 0.5 weight % or less or so. In another example, the concentration of the iodinated compound may be 0.05 weight % or more, 0.1 weight % or more, 0.5 weight % or more, 1 weight % or more, 1.5 weight % or more, or 2 weight % or more, and may also be 9 weight % or less, 8 weight % or less, 7 weight % or less, 6 weight % or less, 5 weight % or less, 4 weight % or less, or 3 weight % or less or so. In the dyeing process, the temperature of the iodine solution is usually about 20° C. to 50° C. or 25° C. to 40° C. or so, and the immersion time is usually about 10 seconds to 300 seconds or 20 seconds to 240 seconds or so, without being limited thereto.

Although the stretching process is generally performed by uniaxial stretching, other types of stretching such as biaxial stretching may also be applied, if necessary. This stretching may also be performed together with the dyeing process and/or the crosslinking process to be described below. The stretching method is not particularly limited and, for example, a wet method may be applied. For example, in this wet method, it is common to perform stretching after dyeing. The stretching may be performed together with crosslinking, and may also be performed multiple times or in multiple stages. The above-described iodinated compound can be contained in the treatment solution applied to the wet stretching method. The concentration of the iodinated compound in the treatment solution may be about 0.01 to 10 weight % or so. In another example, the concentration of the iodinated compound may be 0.05 weight % or more, 0.1 weight % or more, 0.5 weight % or more, 1 weight % or more, 1.5 weight % or more, or 2 weight % or more, and may also be 9 weight % or less, 8 weight % or less, 7 weight % or less, 6 weight % or less, 5 weight % or less, 4 weight % or less, or 3.5 weight % or less or so. In the stretching, the treatment temperature is usually in a range of 25° C. or more, 30° C. to 85° C. or 40° C. to 70° C. or so, and the treatment time is usually 10 seconds to 800 seconds or 30 seconds to 500 seconds, without being limited thereto. In the stretching process, the total draw ratio may be adjusted in consideration of the orientation characteristics and the like, where the total draw ratio may be 3 to 10 times, 4 to 8 times or 5 to 7 times based on the original length of the PVA film, but is not limited thereto. Here, when the stretching is also involved in other processes, such as swelling, dyeing and/or crosslinking processes, in addition to the stretching process, the total draw ratio may mean a cumulative draw ratio including the stretching in the respective processes. Such a total draw ratio may be adjusted to an appropriate range in consideration of orientation, processability or stretching cutting possibility of the polarizing layer, and the like.

In the production process of the polarizing layer, the swelling process may be performed in addition to the dyeing and stretching, which is normally performed before the dyeing process. Contamination or an antiblocking agent on the PVA film surface can be washed by the swelling, whereby there is also an effect capable of reducing unevenness such as dyeing deviation.

In the swelling process, water, distilled water or pure water, and the like can be usually used. The main component of the relevant treatment liquid is water, and if necessary, a small amount of an iodinated compound such as potassium iodide or an additive such as a surfactant, or alcohol, and the like can be included therein. The treatment temperature in the swelling process is usually 20° C. to 45° C. or so, or 20° C. to 40° C. or so, but is not limited thereto. Since the swelling deviations can cause dyeing deviations, the process variables can be adjusted so that the occurrence of such swelling deviations is suppressed as much as possible. Optionally, the proper stretching may also be performed in the swelling process. The draw ratio may be 6.5 times or less, 1.2 to 6.5 times, 2 times to 4 times, or 2 times to 3 times, based on the original length of the PVA-based film. The stretching in the swelling process can control the stretching in the stretching process performed after the swelling process to be small and can control so that the stretching failure of the film does not occur.

The cross-linking process can be performed, for example, using a cross-linking agent such as a boron compound. The order of the cross-linking process is not particularly limited, and the process can be performed, for example, with the dyeing and/or stretching processes, or can proceed separately. The cross-linking process may also be performed several times. As the boron compound, boric acid or borax may be used. The boron compound can be generally used in the form of an aqueous solution or a mixed solution of water and an organic solvent, and usually an aqueous solution of boric acid is used. The boric acid concentration in the boric acid aqueous solution can be selected in an appropriate range in consideration of the cross-linking degree and the heat resistance thereof. An iodinated compound such as potassium iodide can be contained in an aqueous solution of boric acid or the like. The concentration of the iodinated compound in the boric acid aqueous solution may be about 0.01 to 10 weight % or so. In another example, the concentration of the iodinated compound may be 0.05 weight % or more, 0.1 weight % or more, 0.5 weight % or more, 1 weight % or more, 1.5 weight % or more, or 2 weight % or more, and may also be 9 weight % or less, 8 weight % or less, 7 weight % or less, 6 weight % or less, 5 weight % or less, 4 weight % or less, or 3.5 weight % or less or so. The crosslinking process may be performed by immersing the PVA film in a boric acid aqueous solution or the like, and in this process, the treatment temperature is usually in a range of 25° C. or more, 30° C. to 85° C. or 30° C. to 60° C., and the treatment time is usually about 5 seconds to 800 seconds or about 8 seconds to 500 seconds or so.

In the production process of the polarizing layer, a metal ion treatment may be performed, which may be generally referred to as a complementary color process. Such a treatment is performed, for example, by immersing a PVA film in an aqueous solution containing a metal salt. Through this, the metal component such as metal ions can be contained in the polarizing layer, and in this process, the type or ratio of the metal component may be adjusted. As the metal ion that can be applied, metal ions of transition metals such as cobalt, nickel, zinc, chromium, aluminum, copper, manganese or iron can be exemplified, and the color tone can also be adjusted by selecting a proper kind among them.

In order to produce a polarizing layer containing zinc, a zinc component may be included in a treatment liquid (aqueous solution containing a metal salt) applied in the complementary color process. However, if necessary, the zinc component may also be applied during other processes, where the zinc component may also be included in another treatment liquid such as a dyeing solution or a crosslinking solution, or a separate treatment liquid. The zinc component may be introduced by dissolving one or more zinc salts selected from, for example, zinc chloride, zinc iodide, zinc sulfate, zinc nitrate, zinc acetate and the like in the aqueous solution. In this case, the concentration of the zinc salt may be adjusted to about 0.01 to 10 weight % or so in order to achieve the desired zinc content. In another example, the concentration of the zinc salt may be 0.05 weight % or more, 0.1 weight % or more, 0.5 weight % or more, 1 weight % or more, 1.5 weight % or more, or 2 weight % or more, or may also be 9 weight % or less, 8 weight % or less, 7 weight % or less, 6 weight % or less, 5 weight % or less, 4 weight % or less, or 3 weight % or less or so. If necessary, a potassium component may also be included in the treatment liquid. The potassium component may be exemplified by a potassium salt such as potassium iodide. The concentration of the potassium salt may be about 0.01 to 10 weight % or so. In another example, the concentration may also be 0.05 weight % or more, 0.1 weight % or more, 0.5 weight % or more, 1 weight % or more, 1.5 weight % or more, 2 weight % or more, 2.5 weight % or more, 3 weight % or more, 3.5 weight % or more, 4 weight % or more, 4.5 weight % or more, or 5 weight % or more, or may also be 9 weight % or less, 8 weight % or less, 7 weight % or less, or 6 weight % or less or so. By applying the zinc salt or potassium salt as above in the complementary color process, the desired level of zinc and potassium components can be included in the polarizing layer.

In the production process of the polarizing layer, a washing process may be performed after dyeing, crosslinking and stretching. Usually, this washing process may be performed before the complementary color process, which may be performed with water. If necessary, in the water applied to the washing process, other components such as iodine, iodide, other metal salts, or a liquid alcohol such as methanol, ethanol, isopropyl alcohol, butanol or propanol may also be blended in an appropriate amount.

After such processes, a drying process may be performed to produce a polarizing layer. For example, in consideration of the moisture content required for the polarizing layer and the like, the drying process may be performed at an appropriate temperature for a suitable time, and such conditions are not particularly limited.

As described above, in the above process, the zinc and/or potassium component may be included in the polarizing layer. However, the manner for producing the polarizing layer comprising the zinc and/or potassium component is not limited to the above. For example, the zinc salt is included in the treatment liquid applied to the swelling, dyeing, crosslinking, stretching and/or washing treatment, whereby in another process other than the complementary color process, the zinc component may also be included in the polarizing layer. In addition, since the potassium component, such as potassium iodide, may also be contained in the treatment liquid applied to the swelling, dyeing, crosslinking, stretching and/or washing treatment, and the like, the ratio of the potassium component may also be adjusted in this process. While those skilled in the art appropriately adopt a general method for producing a polarizing layer, the desired level of zinc and/or potassium components may be included in the polarizing layer depending on the purpose.

The thickness of the polarizing layer is not limited. In the present application, since a generally known polarizing layer may be applied, the applied thickness is also a usual thickness. Usually, the thickness of the polarizing layer may be in a range of 5 μm to 80 μm, but is not limited thereto.

The optical laminate of this application comprises the reddening-resistant layer.

The present application relates to an optical laminate or display device comprising the reddening-resistant layer, or to the reddening-resistant layer.

The term reddening-resistant layer is a layer capable of preventing, alleviating, reducing, suppressing and/or delaying the reddening of the optical laminate and/or optical functional layer, as mentioned above. The reddening of the optical laminate and/or optical functional layer is expected to be caused by heat and/or moisture, or at least accelerated by heat and/or moisture. As the applications of display devices expand, the optical laminate and/or the optical functional layer are more exposed to higher temperatures, whereby the optical functional layer or the optical laminate, in which the reddening has not been a problem formerly, frequently causes the reddening in the new applications.

Accordingly, a layer, which plays a role in blocking heat applied to the optical laminate and/or the optical functional layer, reducing the degree of the applied heat or slowing down the heat transfer rate, may be applied as the reddening-resistant layer.

In one example, the reddening-resistant layer is a void-containing layer (porous layer) to be described below, or a laminate comprising the void-containing layer (porous layer), which may be a layer present sufficiently adjacent to the optical functional layer. By making the reddening-resistant layer into a void-containing layer (porous layer) or a layer comprising the void-containing layer (porous layer), heat transfer can be effectively blocked. Here, the optical functional layer may be a layer which causes reddening, like the aforementioned iodine-based polarizing layer. In addition, the presence of the reddening-resistant layer sufficiently adjacent to the optical functional layer means a case where the position of the reddening-resistant layer and the distance between the reddening-resistant layer and the optical functional layer is adjusted so that the reddening-resistant layer can block the heat transfer to the optical functional layer in a level capable of preventing, alleviating, reducing, suppressing and/or delaying the reddening. For example, even if a layer having a configuration similar to that of the reddening-resistant layer of the present application, which is described below, exists, such a layer cannot be said to be the reddening-resistant layer mentioned in the present application, unless such a layer is present at the position and the distance that can block the heat transfer to the optical functional layer. For example, the sufficiently adjacent presence may mean a case that the distance between the optical functional layer, which causes the reddening, and the reddening-resistant layer is within about 90 μm, within about 85 μm, within about 80 μm, within about 75 μm, within about 70 μm, within about 65 μm, within about 60 μm, within about 55 μm, within about 50 μm, within about 45 μm, within about 40 μm, within about 35 μm, within about 30 μm, within about 25 μm, within about 20 μm, within about 15 μm, within about 10 μm, within about 5 μm, within about 1 μm, within about 0.9 μm, within about 0.8 μm, within about 0.7 μm, within about 0.6 μm, within about 0.5 μm, within about 0.4 μm, within about 0.3 μm, or within about 0.2 μm. In addition, the sufficient adjacency also includes the case where the optical functional layer and the reddening-resistant layer contact each other, where the distance is 0 μm. Therefore, the lower limit of the distance is 0 μm. In another example, the distance may also be about 0.01 μm or more, about 0.02 μm or more, about 0.03 μm or more, about 0.04 μm or more, about 0.05 μm or more, about 0.09 μm or more, or about 0.1 μm or more or so. Here, the distance may be the shortest interval, the maximum interval or the average interval between the facing surfaces of the reddening-resistant layer and the optical functional layer.

In one example, the reddening-resistant layer is a void-containing layer (porous layer) to be described below, or a laminate comprising the void-containing layer (porous layer), which may be a layer having a sufficient thickness capable of preventing the reddening of the optical functional layer. That is, even when the reddening-resistant layer is made into a void-containing layer (porous layer) or a layer comprising the void-containing layer (porous layer), heat transfer cannot be effectively blocked unless a suitable thickness is secured. For example, even if a layer having a configuration similar to that of the reddening-resistant layer of the present application, which is described below, exists, such a layer cannot be said to be the reddening-resistant layer mentioned in the present application unless such a layer has a thickness that can block the heat transfer to the optical functional layer. In one example, the sufficient thickness may also be, for example, about 200 nm or more, about 250 nm or more, about 300 nm or more, about 350 nm or more, about 400 nm or more, about 450 nm or more, about 500 nm or more, about 550 nm or more, about 600 nm or more, about 650 nm or more, about 700 nm or more, about 750 nm or more, about 800 nm or more, about 850 nm or more, or about 900 nm or more or so. The upper limit of the thickness is not particularly limited. The thicker the reddening-resistant layer is, the better the effect of preventing, alleviating, reducing, suppressing and/or delaying heat is improved. Therefore, the upper limit of the thickness of the reddening-resistant layer or the void-containing layer (porous layer) may be selected in consideration of the thickness required for the optical laminate, and the like as long as the effect of preventing, alleviating, reducing, suppressing and/or delaying heat is ensured, without any special limitation. In one example, the thickness of the reddening-resistant layer or the void-containing layer (porous layer) may also be about 3,000 nm or less, about 2,900 nm or less, about 2,800 nm or less, about 2,700 nm or less, about 2,600 nm or less, about 2,500 nm or less, about 2,400 nm or less, about 2,300 nm or less, about 2,200 nm or less, about 2,100 nm or less, about 2,000 nm or less, or about 1,950 nm or less or so.

In one example, the reddening-resistant layer may be a layer having a thermal diffusivity in a predetermined range. For example, the reddening-resistant layer may have a thermal diffusivity in a level that after forming the relevant reddening-resistant layer on a polymer film to produce a laminate, the thermal diffusivity measured at 95° C. with respect to the laminate is 90% or less relative to the thermal diffusivity of the polymer film alone.

In this case, the reddening-resistant layer may satisfy the following equation 4.

In the present application, the term reddening-resistant layer may refer to a void-containing layer (porous layer) itself or a laminate comprising at least the void-containing layer (porous layer). Therefore, the reddening-resistant layer referred to in the following equation 4 may be a void-containing layer (porous layer) or a laminate comprising the same.

$$H_L \leq 0.9 \times H_P \qquad \text{[Equation 4]}$$

In Equation 4, $H_L$ is a thermal diffusivity of a laminate of a polymer film and the reddening-resistant layer formed on one side of the polymer film, and $H_P$ is the thermal diffusivity of the polymer film.

In this specification, the type of the polymer film for measuring the thermal diffusivity is not particularly limited. For example, the polymer film in Equation 4 above may be a TAC (triacetyl cellulose) film having a thickness of about 60 μm. In another example, the thermal diffusivity (95° C.) of the laminate may be about 89% or less or so, about 88% or less or so, about 87% or less or so, about 86% or less or so, about 85% or less or so, about 84% or less or so, about 83% or less or so, about 82% or less or so, about 81% or less or so, about 80% or less or so, about 79% or less or so, about 78% or less or so, about 77% or less or so, about 76% or less or so, about 75% or less or so, about 74% or less or so, about 73% or less or so, about 72% or less or so, about 71% or less or so, about 70% or less or so, about 69% or less or so, about 68% or less or so, about 67% or less or so, about 66% or less or so, or about 65% or less or so, or may also be about 10% or more or so, about 11% or more or so, about 12% or more or so, about 13% or more or so, about 14% or more or so, about 15% or more or so, about 16% or more or so, about 17% or more or so, about 18% or more or so, about 19% or more or so, about 20% or more or so, about 21% or more or so, about 22% or more or so, about 23% or more or so, about 24% or more or so, about 25% or more or so, about 26% or more or so, about 27% or more or so, about 28% or more or so, about 29% or more or so, about 30% or more or so, about 31% or more or so, about 32% or more or so, about 33% or more or so, about 34% or more or so, about 35% or more or so, about 36% or more or so, about 37% or more or so, about 38% or more or so, about 39% or more or so, about 40% or more or so, about 41% or more or so, about 42% or more or so, about 43% or more or so, about 44% or more or so, about 45% or more or so, about 46% or more or so, about 47% or more or so, about 48% or more or so, about 49% or more or so, about 50% or more or so, about 51% or more or so, about 52% or more or so, about 53% or more or so, about 54% or more or so, about 55% or more or so, about 56% or more or so, about 57% or more or so, about 58% or more or so, about 59% or more or so, or about 60% or more or so, of the thermal diffusivity (95° C.) ($H_P$) of the TAC film.

Therefore, the coefficient multiplied by $H_P$ in Equation 4 may be 0.89, 0.88, 0.87, 0.86, 0.85, 0.84, 0.83, 0.82, 0.81, 0.80, 0.79, 0.78, 0.77, 0.76, 0.75, 0.74, 0.73, 0.72, 0.71, 0.70, 0.69, 0.68, 0.67, 0.66 or 0.65. In Equation 4, $H_L$ may also be about $0.10 \times H_P$ or more, about $0.11 \times H_P$ or more, about $0.12 \times H_P$ or more, about $0.13 \times H_P$ or more, about $0.14 \times H_P$ or more, about $0.15 \times H_P$ or more, about $0.16 \times H_P$ or more, about $0.17 \times H_P$ or more, about $0.18 \times H_P$ or more, about $0.19 \times H_P$ or more, about $0.20 \times H_P$ or more, about $0.21 \times H_P$ or more, about $0.22 \times H_P$ or more, about $0.23 \times H_P$ or more, about $0.24 \times H_P$ or more, about $0.25 \times H_P$ or more, about $0.26 \times H_P$ or more, about $0.27 \times H_P$ or more, about $0.28 \times H_P$ or more, about $0.29 \times H_P$ or more, about $0.30 \times H_P$ or more, about $0.31 \times H_P$ or more, about $0.32 \times H_P$ or more, about $0.33 \times H_P$ or more, about $0.34 \times H_P$ or more, about $0.35 \times H_P$ or more, about $0.36 \times H_P$ or more, about $0.37 \times H_P$ or more, about $0.38 \times H_P$ or more, about $0.39 \times H_P$ or more, about $0.40 \times H_P$ or more, about $0.41 \times H_P$ or more, about $0.42 \times H_P$ or more, about $0.43 \times H_P$ or more, about $0.44 \times H_P$ or more, about $0.45 \times H_P$ or more, about $0.46 \times H_P$ or more, about $0.47 \times H_P$ or more, about $0.48 \times H_P$ or more, about $0.49 \times H_P$ or more, about $0.50 \times H_P$ or more, about $0.51 \times H_P$ or more, about $0.52 \times H_P$ or more, about $0.53 \times H_P$ or more, about $0.54 \times H_P$ or more, about $0.55 \times H_P$ or more, about $0.56 \times H_P$ or more, about $0.57 \times H_P$ or more, about $0.58 \times H_P$ or more, about $0.59 \times H_P$ or more, or about $0.60 \times H_P$ or more.

Surface characteristics of the reddening-resistant layer or the void-containing layer (porous layer) may be controlled. In order to be positioned adjacent to an optical functional layer that the reddening should be prevented, alleviated, reduced, suppressed and/or delayed, the reddening-resistant layer or the void-containing layer (porous layer) may be directly attached to the optical functional layer, or may be attached to another layer of the optical laminate adjacent to the optical functional layer. In this case, by controlling the surface characteristics of the reddening-resistant layer or the void-containing layer (porous layer), the relevant reddening-resistant layer or void-containing layer (porous layer) may be attached to the optical functional layer or another layer while having excellent adhesiveness therewith, thereby more effectively preventing, alleviating, reducing, suppressing and/or delaying the reddening. For example, the reddening-resistant layer or the void-containing layer (porous layer) may include at least one surface having a surface area ratio of about 0.02 or more as measured by an atomic force microscope (AFM). For example, at least one of the main surfaces of the reddening-resistant layer or the void-containing layer (porous layer), or both surfaces may have the above surface area ratio. In one example, the surface of the reddening-resistant layer or void-containing layer (porous layer) having at least the surface area ratio may be a surface facing the optical functional layer or another layer to which the reddening-resistant layer or the void-containing layer (porous layer) is attached. In another example, the surface area ratio of the reddening-resistant layer or the void-containing layer (porous layer) may be about 0.022 or more, about 0.024 or more, about 0.026 or more, about 0.028 or more, about 0.03 or more, about 0.032 or more, or about 0.034 or more, or may also be about 0.5 or less, about 0.45 or less, about 0.4 or less, about 0.35 or less, about 0.3 or less, or about 0.25 or less or so. The surface area ratio can be measured by the method as described in the examples.

The reddening-resistant layer or the void-containing layer (porous layer) may exhibit a desired level of reflectance for infrared rays. Since heat is also transferred in the form of infrared rays, it is possible to secure desired anti-reddening characteristics even when the appropriate reflectance is shown therefor. In this specification, the term infrared rays may mean electromagnetic waves having any one wavelength in a range of approximately 800 nm to 1,300 nm, or wavelengths within a range of some region in the range or wavelengths of the entire region. Accordingly, the infrared reflectance may be reflectance for any one wavelength in the range of 800 nm to 1,300 nm, or may be average reflectance for the range of some region in the range or the entire region. The reflectance may be measured according to the manner described in the examples. The reddening-resistant layer or the void-containing layer (porous layer) may have the infrared reflectance of about 2% or more. In another example, the reflectance may be about 2.5% or more, about 3% or more, about 3.5% or more, or about 4% or more. Since it means that the higher the value of the reflectance, the reddening-resistant layer or the void-containing layer (porous layer) can appropriately block and/or delay the heat applied to the optical laminate and/or the optical functional layer, the upper limit is not particularly limited. Exemplarily, the infrared reflectance may also be about 10% or less, about 9% or less, about 8% or less, about 7% or less, about 6% or less, or about 5% or less or so.

As the reddening-resistant layer or the void-containing layer (porous layer), various layers may be applied without particular limitation, as long as they have suitable transmittance that can be applied to the optical laminate and have the above characteristics (thermal diffusivity, surface area ratio and/or reflectance). If they have the above characteristics, it is possible to prevent, alleviate, reduce, suppress and/or delay the reddening, so that as long as the transmittance is properly secured, all can be theoretically applied in the present application. Here, the transmittance required in the optical laminate may be about 70% or more, about 75% or more, about 80% or more, about 85% or more, or about 90% or more. The higher the value of the transmittance is, the more suitable it is, so that the upper limit thereof is not particularly limited. For example, the transmittance may be about 100% or less, about 95% or less, or about 90% or less or so. Here, the transmittance may be transmittance or average transmittance for light in a visible light region, for example, any one wavelength in a range of approximately 380 nm to 780 nm, or wavelengths in a predetermined region in the range or the entire region. When applying a void-containing layer (porous layer) or a laminate comprising the void-containing layer (porous layer) as the reddening-resistant layer, heat transfer can be effectively blocked by the voids present in the reddening-resistant layer, but it can be disadvantageous in terms of transmittance as the voids scatter or diffract light in the optical laminate. However, in the present application, by controlling the shape of the voids, as described below, there is no drop in transmittance due to scattering or diffraction of the light, or such a drop can be limited at least to a level that there is no problem in use.

As the reddening-resistant layer, for example, a void-containing layer (porous layer) or a layer comprising the void-containing layer (porous layer) can be applied. That is, as described above, in the present application, the reddening-resistant layer may refer to the void-containing layer (porous layer) itself, or may also refer to the laminate comprising the void-containing layer (porous layer) and other layers as long as it satisfies the purpose of preventing the reddening. In one example, the reddening-resistant layer may exhibit the aforementioned characteristics (thermal diffusivity, surface area ratio and/or infrared reflectance) by comprising the void-containing layer (porous layer). Thus, the above-mentioned thermal diffusivity, surface area ratio and/or infrared reflectance may be for the void-containing layer (porous layer), or may also be for the laminate comprising at least the void-containing layer (porous layer). Here, the type of other elements included in the reddening-resistant layer together with the void-containing layer (porous layer) is not particularly limited, which may be, for example, elements constituting the optical laminate such as the polarizing layer or its protective film and the retardation film.

The void-containing layer is a layer comprising at least one or more voids therein, where the reddening-resistant layer can perform the function of preventing, alleviating, reducing, suppressing and/or delaying heat transfer through these voids. In the present application, when the void-containing layer is referred to as a porous layer, at least two or more voids are included inside the void-containing layer. In order to secure the above-described physical properties, for example, thermal diffusivity, surface area ratio and/or reflectance, and the like, it is important that the reddening-resistant layer comprises the void-containing layer (porous layer). At this time, the shape of the voids included in the void-containing layer (porous layer) is not particularly limited, which may be substantially spherical or ellipsoidal, or other various types of voids may be all applied.

The size (diameter) of the voids may be in a range of approximately 0.5 nm to 100 nm. When the relevant void is spherical, the size of the void means the particle diameter, and when the void is not spherical, the void has been assumed to have the same volume sphere and it is the particle diameter of the sphere at that time. In another example, the size of the void may be about 1 nm or more, about 2 nm or more, about 3 nm or more, about 4 nm or more, about 5 nm or more, about 6 nm or more, about 7 nm or more, about 8 nm or more, about 9 nm or more, about 10 nm or more, about 11 nm or more, about 12 nm or more, about 13 nm or more, about 14 nm or more, about 15 nm or more, about 16 nm or more, about 17 nm or more, about 18 nm or more, about 19 nm or more, about 20 nm or more, about 21 nm or more, about 22 nm or more, about 23 nm or more, about 24 nm or more, about 25 nm or more, about 26 nm or more, about 27 nm or more, about 28 nm or more, about 29 nm or more, about 31 nm or more, about 32 nm or more, about 33 nm or more, about 34 nm or more, about 35 nm or more, about 36 nm or more, about 37 nm or more, or about 38 nm or more, or may also be about 99 nm or less, 98 nm or less, about 97 nm or less, about 96 nm or less, about 95 nm or less, about 94 nm or less, about 93 nm or less, about 92 nm or less, about 91 nm or less, about 90 nm or less, about 89 nm or less, about 88 nm or less, about 87 nm or less, about 86 nm or less, about 85 nm or less, about 84 nm or less, about 83 nm or less, about 82 nm or less, about 81 nm or less, about 79 nm or less, about 78 nm or less, about 77 nm or less, about 76 nm or less, about 75 nm or less, about 74 nm or less, about 73 nm or less, about 72 nm or less, about 71 nm or less, about 69 nm or less, about 68 nm or less, about 67 nm or less, about 66 nm or less, about 65 nm or less, about 64 nm or less, about 63 nm or less, about 62 nm or less, about 61 nm or less, about 59 nm or less, about 58 nm or less, about 57 nm or less, about 56 nm or less, about 55 nm or less, about 54 nm or less, about 53 nm or less, about 52 nm or less, about 51 nm or less, about 50 nm or less, about 49 nm or less, about 48 nm or less, about 47 nm or less, about 46 nm or less, or about 45 nm or less or so.

In order to maximize the effect of the reddening-resistant layer, to secure the aforementioned physical properties (thermal diffusivity, surface area ratio and/or reflectance, etc.), and to maintain the transmittance, the position or distribution of the voids in the void-containing layer (porous layer) can be controlled.

For example, the reddening-resistant layer or the void-containing layer (porous layer) may exhibit at least one peak within a scattering vector range of $0.06$ $nm^{-1}$ to $0.209$ $nm^{-1}$ in a log value graph of scattering intensity of a small angle X-ray scattering (SAXS) analysis. The characteristic is a characteristic which reflects the average distance between voids. For example, the fact that the scattering vector exhibiting the peak becomes smaller means a tendency that the average distance between the voids in the reddening-resistant layer or the void-containing layer (porous layer) becomes farther, and conversely, the fact that it becomes larger means a tendency that the average distance between the voids becomes closer.

When the scattering vector is about $0.06$ $nm^{-1}$ or more, it is advantageous in the characteristic that as the voids are appropriately densified in the reddening-resistant layer or the void-containing layer (porous layer), the applied heat can be blocked or reduced. Also, when the vector is about $0.209$ $nm^{-1}$ or less, the voids are arranged at appropriate intervals in the reddening-resistant layer or the void-containing layer (porous layer), so that the surface roughness of the reddening-resistant layer or the void-containing layer (porous layer), or the like, is maintained at an appropriate level, which can make the application of the reddening-resistant layer or the void-containing layer (porous layer) to the optical laminate easier. In addition, the transmittance of the reddening-resistant layer can also be maintained in the appropriate range within the scattering vector range. In another example, the scattering vector from which the peak is identified may be about $0.065$ $nm^{-1}$ or more, about $0.07$ nm$^{-1}$ or more, about 0.075 nm$^{-1}$ or more, about 0.08 nm$^{-1}$ or more, about 0.085 nm$^{-1}$ or more, about 0.09 nm$^{-1}$ or more, about 0.095 nm$^{-1}$ or more, or 0.1 nm$^{-1}$ or more, and may also be about 0.205 nm$^{-1}$ or less, about 0.2 nm$^{-1}$ or less, about 0.19 nm$^{-1}$ or less, about 0.185 nm$^{-1}$ or less, about 0.18 nm$^{-1}$ or less, or about 0.16 nm$^{-1}$ or less.

Here, the peak is the extreme value or inflection point that in the log value graph of the scattering intensity identified by the analysis, the log value of the scattering intensity is convex upward. The scattering vector is a value defined by Equation 5 below, where at least one or more peaks may be identified within a range of such a scattering vector.

$$q = 4\pi \sin(\theta/\lambda) \quad \text{[Equation 5]}$$

In Equation 5, q is the scattering vector, θ is the value ½ times the scattering angle, and λ is the wavelength (unit:nm) of the irradiated X-ray.

The manner of performing the small angle X-ray scattering evaluation is in accordance with the description of the examples herein.

The reddening-resistant layer or the void-containing layer (porous layer) may have an A value of 1.5 or less, a B value in a range of 0 to 0.01 and a C value in a range of 0 to 0.001, which satisfy the following equation 6.

$$n(\lambda) = A + \frac{B}{\lambda^2} + \frac{C}{\lambda^4} \quad \text{[Equation 6]}$$

In Equation 6, n(λ) is the refractive index of the reddening-resistant layer or the void-containing layer (porous layer) at a wavelength of λ, and λ is any one wavelength in a range of 300 to 1800 nm.

Equation 6 fits the ellipticity of polarization measured by the ellipsometry of the reddening-resistant layer or the void-containing layer (porous layer) according to a so-called Cauchy model. When the reddening-resistant layer or the void-containing layer (porous layer) has A, B and C values in the above-described ranges satisfying Equation 6 above, the reddening-resistant layer or the void-containing layer (porous layer) may have void characteristics that can express the reddening function. Equation 6 above reflects the refractive index characteristic of the reddening-resistant layer or the void-containing layer (porous layer). The total refractive index of the reddening-resistant layer or the void-containing layer (porous layer) is determined by the refractive index of the voids constituting the reddening-resistant layer or the void-containing layer (porous layer), and the refractive index of other components, such as a binder, other than the voids. Therefore, the A, B and C values of the reddening-resistant layer or the void-containing layer (porous layer) in Equation 6 above may reflect the quantity of voids in the reddening-resistant layer. In one example, when the A, B and/or C values are within the above ranges, the surface roughness of the reddening-resistant layer or the void-containing layer (porous layer), or the like, is maintained in an appropriate level, while the voids in the reddening-resistant layer or the void-containing layer (porous layer) are present in a level capable of appropriately blocking or delaying the movement of heat, so that the application of the reddening-resistant layer or the void-containing layer (porous layer) to the optical laminate can be more easily performed. Furthermore, in the ranges of the A, B and/or C values, the transmittance of the reddening-resistant layer or the void-containing layer (porous layer) in the optical laminate can also be maintained stably.

In another example, the A value may be about 1.1 or more, about 1.15 or more, about 1.2 or more, about 1.25 or more, or about 1.3 or more. Here, in another example, the B value may be about 0.0001 or more, about 0.0002 or more, about 0.0003 or more, about 0.0004 or more, about 0.0005 or more, about 0.0006 or more, or about 0.0007 or more, or may also be about 0.009 or less, about 0.008 or less, about 0.007 or less, about 0.006 or less, about 0.005 or less, or about 0.004 or less or so. Here, in another example, the C value may be about 0.000001 or more, about 0.000002 or more, about 0.000003 or more, about 0.000004 or more, about 0.000005 or more, about 0.000006 or more, about 0.000007 or more, about 0.000008 or more, about 0.000009 or more, about 0.00001 or more, about 0.00002 or more, about 0.00003 or more, about 0.00004 or more, about 0.00005 or more, about 0.00006 or about 0.00007 or more, or may also be about 0.0009 or less, about 0.0008 or less, about 0.0007 or less, about 0.0006 or less, about 0.0005 or less, or about 0.0004 or less or so.

In Equation 6, λ may be any one wavelength in the range of about 300 to about 1800 nm, and in one example, it may be about 400 nm or more, or about 500 nm or more, or may be about 1700 nm or less, about 1600 nm or less, about 1500 nm or less, about 1400 nm or less, about 1300 nm or less, about 1200 nm or less, about 1100 nm or less, about 1000 nm or less, about 900 nm or less, about 800 nm or less, about 700 nm or less, or about 600 nm or less, or may be a wavelength range of about 550 nm. The reddening-resistant layer or void-containing layer (porous layer) satisfying Equation 6 may have a refractive index (based on a wavelength of 550 nm) of about 1.5 or less, and in another example, the refractive index may be about 1.1 or more, or about 1.15 or more.

The volume fraction of the voids in the reddening-resistant layer or the void-containing layer (porous layer) may be about 0.1 or more. When the total volume of the reddening-resistant layer or the void-containing layer (porous layer) has been converted to one, the volume fraction is the ratio of the space volume occupied by the voids. In this range, the reddening-resistant layer or the void-containing layer (porous layer) can appropriately block or reduce heat transfer. Also, in the range, the transmittance of the reddening-resistant layer or the void-containing layer (porous layer) in the optical laminate can also be maintained stably. The volume fraction can be measured by confirming the density, mass, and volume of the reddening-resistant layer or the void-containing layer (porous layer) through a buoyancy method or the like, or when the reddening-resistant layer or the void-containing layer (porous layer) is formed by using hollow particles, as described below, it can be confirmed through the amount of the hollow particles and the amount of the binder as applied, and the like.

The reddening-resistant layer or the void-containing layer (porous layer) may be formed in various ways. A representative method of forming a layer containing voids is a manner of applying hollow particles. Therefore, in one example, the reddening-resistant layer may comprise at least a binder and hollow particles.

By controlling the refractive indexes of the binder and the shell portion of the hollow particles, the size distribution of the hollow particles and the pores therein, the amount of the hollow particles, and the like, the above-described characteristics (thermal diffusivity (Equation 4), surface characteristics (surface area ratio of AFM), infrared reflectance, visible light transmittance, SAXS characteristics, volume fraction and/or refractive index characteristics) can be satisfied.

Various kinds of binders may be applied without particular limitation. For example, as the binder, various curable resin compositions applicable for optics may be applied. The resin applicable for optics includes, for example, acrylic series, epoxy series and/or silicone series, and the like, where the binder may be formed by applying the resin or a precursor capable of forming the same. Such a resin or precursor may be curable, which may be, for example, a material that is cured by irradiation of light such as ultraviolet rays or electron beams, a material that is cured by heat, or a material that is cured by other actions such as moisture.

As the binder, those having a refractive index (based on a wavelength of 550 nm) in a range of approximately 1.1 to 1.6 may be applied. The reddening-resistant layer satisfying Equation 6 as described above may be easily formed by combining it under this refractive index range with hollow particles. In another example, the refractive index may be about 1.15 or more, about 1.2 or more, about 1.25 or more, about 1.3 or more, about 1.35 or more, or about 1.4 or more, or may be about 1.55 or less, or about 1.5 or less or so.

A typical binder that satisfies such a refractive index is an acrylic binder. The binder of the reddening-resistant layer may comprise a polymerized unit of a polymerizable acrylic compound.

In one example, as the acrylic compound, alkyl (meth)acrylates or alkoxy (meth)acrylates having an alkyl group or alkoxy group with 1 to 20 carbon atoms, 1 to 16 carbon atoms, 1 to 12 carbon atoms, 1 to 8 carbon atoms or 1 to 4 carbon atoms; monofunctional acrylate compounds such as 2-hydroxyethyl (meth)acrylate, 2-hydroxypropyl (meth)acrylate, 4-hydroxybutyl (meth)acrylate, 6-hydroxyhexyl (meth)acrylate or 8-hydroxyoctyl (meth)acrylate; bifunctional acrylates such as 1,4-butanediol di(meth)acrylate, 1,6-hexanediol di(meth)acrylate, neopentyl glycol di(meth)acrylate, polyethylene glycol di(meth)acrylate, neopentylglycol adipate di(meth)acrylate, hydroxypivalic acid neopentyl glycol di(meth)acrylate, dicyclopentanyl di(meth)acrylate, caprolactone modified dicyclopentenyl di(meth)acrylate, ethylene oxide modified di(meth)acrylate, di(meth)acryloxyethyl isocyanurate, allylated cyclohexyl di(meth)acrylate, tricyclodecane dimethanol (meth)acrylate, dimethylol dicyclopentane di(meth)acrylate, ethylene oxide modified hexahydrophthalic acid di(meth)acrylate, tricyclodecane dimethanol (meth)acrylate, neopentyl glycol modified trimethylpropane di(meth)acrylate, adamantane di(meth)acrylate or 9,9-bis[4-(2-acryloyloxyethoxy)phenyl]fluorene; trifunctional acrylates such as trimethylolpropane tri(meth)acrylate, dipentaerythritol tri(meth)acrylate, propionic acid modified dipentaerythritol tri(meth)acrylate, pentaerythritol tri(meth)acrylate, propylene oxide modified trimethylolpropane tri(meth)acrylate, trifunctional urethane (meth)acrylate or tris(meth)acryloxyethyl isocyanurate; tetrafunctional acrylates such as diglycerin tetra(meth)acrylate or pentaerythritol tetra(meth)acrylate; pentafunctional acrylates such as propionic acid modified dipentaerythritol penta(meth)acrylate; and hexafunctional acrylates such as dipentaerythritol hexa(meth)acrylate, caprolactone modified dipentaerythritol hexa(meth)acrylate or urethane (meth)acrylate (e.g. a reaction product of an isocyanate monomer and trimethylolpropane tri(meth)acrylate), and the like can be used.

As the polyfunctional acrylate, a compound termed a so-called photo-curable oligomer in the industry, such as urethane acrylate, epoxy acrylate, polyester acrylate or polyether acrylate and the like can be used. One or two or more of appropriate kinds among these compounds can be selected and used.

The kind of the binder for forming the reddening-resistant layer or the void-containing layer (porous layer) is not limited to the above, and various other materials for optics may all be applied.

In order to ensure appropriate void characteristics satisfying desired characteristics (thermal diffusivity (Equation 4), surface characteristics (surface area ratio of AFM), infrared reflectance, visible light transmittance, SAXS characteristics, volume fraction and/or refractive index characteristics) in combination with hollow particles, the polyfunctional acrylate from the above-described kinds may be applied as the binder. That is, the binder may include a polymer of the polyfunctional acrylate. The polyfunctional acrylate is a compound having at least two or more polymerizable functional groups (acryloyl group, methacryloyl group, acryloyloxy group or methacryloyloxy group). In another example, the number of the acrylic polymerizable functional groups may be 3 or more, or may be 10 or less, 9 or less, 8 or less, 7 or less, 6 or less, 5 or less, 4 or less, or 3 or less. In forming a reddening-resistant layer in which thermal diffusivity (Equation 4), surface characteristics (surface area ratio of AFM), infrared reflectance, visible light transmittance, SAXS characteristics, volume fraction and/or refractive index characteristics are stably secured through the desired crosslinking degree and pore characteristics, it is advantageous to apply a compound without any hydroxy group and any ring structure (for example, an aromatic ring structure or a dicyclopentadiene structure) as such a polyfunctional acrylate. For the same reason, it is preferred that the hydroxy group or the ring structure does not exist in the binder of the reddening-resistant layer (void-containing layer (porous layer)) or even if it exists, the ratio thereof is limited. Also, in forming a reddening-resistant layer in which thermal diffusivity (Equation 4), surface characteristics (surface area ratio of AFM), infrared reflectance, visible light transmittance, SAXS characteristics, volume fraction and/or refractive index characteristics are stably secured through the desired crosslinking degree and pore characteristics, it is advantageous to use a compound having a molecular weight in a range of about 150 to about 1,000 g/mol as the polyfunctional acrylate. In another example, the molecular weight may be about 170 g/mol or more, about 190 g/mol or more, about 210 g/mol or more, about 230 g/mol or more, about 250 g/mol or more, about 270 g/mol or more, or about 290 g/mol or more, or may also be about 980 g/mol or less, about 960 g/mol or less, about 940 g/mol or less, about 920 g/mol or less, about 900 g/mol or less, about 880 g/mol or less, about 860 g/mol or less, about 840 g/mol or less, about 820 g/mol or less, about 800 g/mol or less, about 780 g/mol or less, about 760 g/mol or less, about 740 g/mol or less, about 720 g/mol or less, about 700 g/mol or less, about 680 g/mol or less, about 660 g/mol or less, about 640 g/mol or less, about 620 g/mol or less, about 600 g/mol or less, about 580 g/mol or less, about 560 g/mol or less, about 540 g/mol or less, about 520 g/mol or less, about 500 g/mol or less, about 480 g/mol or less, about 460 g/mol or less, about 440 g/mol or less, about 420 g/mol or less, about 400 g/mol or less, about 380 g/mol or less, about 360 g/mol or less, about 340 g/mol or less, about 320 g/mol or less, or about 300 g/mol or less or so. The binder may substantially comprise the polyfunctional acrylate as a main component in terms of more efficiently securing the desired characteristics. Thus, the weight ratio of the polyfunctional acrylate in the binder may be about 50% or more, about 52% or more, about 54% or more, about 56% or more, about 58% or more, about 60% or more, about 62% or more, about 64% or more, about 66% or more, about 68% or more, about 70% or more, about 72% or more, about 74% or more, about 76% or more, about 78% or more, about 80% or more, about 82% or more, about 84% or more, about 86% or more, about 88% or more, about 90% or more, about 92% or more, about 94% or more, about 96% or more, or about 98% or more or so, and this ratio may also be about 100% or less, or less than about 100% or so. The ratio may be the ratio of the polyfunctional acrylate in the binder, and for example, when the void-containing layer (porous layer) is a layer comprising the binder and hollow particles, it may be a ratio based on the weight obtained by subtracting the hollow particles from the total weight of the void-containing layer (porous layer).

As the hollow particles, for example, particles having a specific particle size distribution may be used in order to satisfy each of the aforementioned physical properties. For example, as the hollow particles, particles that in the weight cumulative curve of the particle size distribution, the D10 particle diameter in the range of about 20 nm to about 50 nm or about 25 nm to about 50 nm, the D50 particle diameter in the range of about 50 nm to about 100 nm or about 55 nm to about 95 nm, and the D90 particle diameter in the range of about 100 nm to about 200 nm or about 110 nm to about 180 nm, respectively, can be applied. Here, when the total weight of the hollow particles is 100 weight, the D10, D50 and D90 particle diameters are values corresponding to about 10 weight %, about 50 weight % and about 90 weight % of the maximum value (100 weight %), respectively, in the cumulative distribution graph indicating the weight for each particle diameter. Through the application of the particles having the particle diameter distribution as described above, the desired reddening-resistant layer can be effectively formed.

In another example, the D10 particle diameter may be about 21 nm or more, about 22 nm or more, about 23 nm or more, about 24 nm or more, about 25 nm or more, about 26 nm or more, about 27 nm or more, about 28 nm or more, about 29 nm or more, about 30 nm or more, about 31 nm or more, or about 32 nm or more, or may also be about 49 nm or less, about 48 nm or less, about 47 nm or less, about 46 nm or less, about 45 nm or less, about 44 nm or less, about 43 nm or less, about 42 nm or less, about 41 nm or less, about 40 nm or less, about 39 nm or less, about 38 nm or less, about 37 nm or less, about 36 nm or less, about 35 nm or less, about 34 nm or less, or about 33 nm or less or so.

In another example, the D50 particle diameter may be about 56 nm or more, about 57 nm or more, about 58 nm or more, about 59 nm or more, about 60 nm or more, about 61 nm or more, or 62 nm or more, or may also be about 99 nm or less, about 98 nm or less, about 97 nm or less, or about 96 nm or less, about 95 nm or less, about 94 nm or less, about 93 nm or less, about 92 nm or less, about 91 nm or less, about 90 nm or less, about 89 nm or less, about 88 nm or less, about 87 nm or less, about 86 nm or less, about 85 nm or less, about 84 nm or less, about 83 nm or less, about 82 nm or less, about 81 nm or less, about 79 nm or less, about 78 nm or less, about 77 nm or less, about 76 nm or less, about 75 nm or less, about 74 nm or less, about 73 nm or less, about 72 nm or less, about 71 nm or less, or about 70 nm or less or so.

In another example, the D90 particle diameter may be about 111 nm or more, about 112 nm or more, about 113 nm or more, about 114 nm or more, about 115 nm or more, about 116 nm or more, about 117 nm or more, about 118 nm or more, about 119 nm or more, about 120 nm or more, or about 121 nm or more, about 122 nm or more, or 123 nm or more, or may also be about 179 nm or less, about 178 nm or less, about 177 nm or less, about 176 nm or less, about 175 nm or less, about 174 nm or less, about 173 nm or less, about 172 nm or less, about 171 nm or less, about 170 nm or less, about 169 nm or less, about 168 nm or less, about 167 nm or less, about 166 nm or less, about 165 nm or less, about 164 nm or less, about 163 nm or less, about 162 nm or less, about 161 nm or less, about 160 nm or less, about 159 nm or less, about 158 nm or less, about 157 nm or less, about 156 nm or less, about 155 nm or less, about 154 nm or less, about 153 nm or less, about 152 nm or less, about 151 nm or less, about 150 nm or less, about 149 nm or less, about 148 nm or less, about 147 nm or less, about 146 nm or less, about 145 nm or less, about 144 nm or less, about 143 nm or less, about 142 nm or less, about 141 nm or less, about 140 nm or less, about 139 nm or less, about 138 nm or less, about 137 nm or less, about 136 nm or less, about 135 nm or less, about 134 nm or less, about 133 nm or less, about 132 nm or less, about 131 nm or less, about 130 nm or less, about 129 nm or less, about 128 nm or less, about 127 nm or less, or about 126 nm or less or so.

As the hollow particles, particles that the pore size corresponds to the void size may be applied. Thus, the pore size may be in the range of about 0.5 nm to about 100 nm.

In another example, the pore size may be about 1 nm or more, about 2 nm or more, about 3 nm or more, about 4 nm or more, about 5 nm or more, about 6 nm or more, about 7 nm or more, about 8 nm or more, about 9 nm or more, about 10 nm or more, about 11 nm or more, about 12 nm or more, about 13 nm or more, about 14 nm or more, about 15 nm or more, about 16 nm or more, about 17 nm or more, about 18 nm or more, about 19 nm or more, about 20 nm or more, about 21 nm or more, about 22 nm or more, about 23 nm or more, about 24 nm or more, about 25 nm or more, about 26 nm or more, about 27 nm or more, about 28 nm or more, about 29 nm or more, about 31 nm or more, about 32 nm or more, about 33 nm or more, about 34 nm or more, about 35 nm or more, about 36 nm or more, about 37 nm or more, or about 38 nm or more, or may also be about 99 nm or less, about 98 nm or less, about 97 nm or less, about 96 nm or less, about 95 nm or less, about 94 nm or less, about 93 nm or less, about 92 nm or less, about 91 nm or less, about 90 nm or less, about 89 nm or less, about 88 nm or less, about 87 nm or less, about 86 nm or less, about 85 nm or less, about 84 nm or less, about 83 nm or less, about 82 nm or less, about 81 nm or less, about 79 nm or less, about 78 nm or less, about 77 nm or less, about 76 nm or less, about 75 nm or less, about 74 nm or less, about 73 nm or less, about 72 nm or less, about 71 nm or less, about 69 nm or less, about 68 nm or less, about 67 nm or less, about 66 nm or less, about 65 nm or less, about 64 nm or less, about 63 nm or less, about 62 nm or less, about 61 nm or less, about 59 nm or less, about 58 nm or less, about 57 nm or less, about 56 nm or less, about 55 nm or less, about 54 nm or less, about 53 nm or less, about 52 nm or less, about 51 nm or less, about 50 nm or less, about 49 nm or less, about 48 nm or less, about 47 nm or less, about 46 nm or less, or about 45 nm or less or so.

Various kinds of hollow particles may be applied without particular limitation as long as they may have the characteristics as above and exhibit the aforementioned characteristics (thermal diffusivity (Equation 4), surface characteristics (surface area ratio of AFM), infrared reflectance, visible light transmittance, SAXS characteristics, volume fraction and/or refractive index characteristics).

For example, as the hollow particles, organic particles in which the shell portion is made of an organic substance, inorganic particles in which it is made of an inorganic substance and/or organic-inorganic particles in which it is made of an organic-inorganic substance, and the like may be used. Such particles may be exemplified by acrylic particles such as PMMA (poly(methyl methacrylate)), epoxy particles, nylon particles, styrene particles and/or copolymer particles of styrene/vinyl monomers, and the like, or inorganic particles such as silica particles, alumina particles, indium oxide particles, tin oxide particles, zirconium oxide particles, zinc oxide particles and/or titania particles, and the like, but are not limited thereto.

The reddening-resistant layer or the void-containing layer (porous layer) may comprise the hollow particles in a ratio of about 5 weight % or more. In another example, the ratio may be about 10 weight % or more, about 15 weight % or more, about 20 weight % or more, about 25 weight % or more, about 30 weight % or more, about 35 weight % or more, about 40 weight % or more, about 45 weight % or more, about 50 weight % or more, about 55 weight % or more, about 60 weight % or more, about 65 weight % or more, about 70 weight % or more, about 75 weight % or more, about 80 weight % or more, about 85 weight % or more, about 90 weight % or more, about 95 weight % or more, about 100 weight % or more, about 105 weight % or more, about 110 weight % or more, about 115 weight % or more, about 120 weight % or more, about 125 weight % or more, about 130 weight % or more, about 135 weight % or more, about 140 weight % or more, about 145 weight % or more, about 150 weight % or more, about 155 weight % or more, about 160 weight % or more, about 165 weight % or more, about 170 weight % or more, about 175 weight % or more, or about 180 weight % or more. In another example, the ratio may also be about 9,000 weight % or less, about 8,000 weight % or less, about 7,000 weight % or less, about 6,000 weight % or less, about 5,000 weight % or less, about 4,000 weight % or less, about 3,000 weight % or less, about 2,000 weight % or less, about 1,000 weight % or less, about 900 weight % or less, about 800 weight % or less, about 700 weight % or less, about 600 weight % or less, about 500 weight % or less, about 400 weight % or less, about 300 weight % or less, about 250 weight % or less, about 240 weight % or less, about 230 weight % or less, about 220 weight % or less, about 210 weight % or less, or about 200 weight % or less or so.

The ratio of the hollow particles may be adjusted according to the desired characteristics. In one example, the reddening-resistant layer or the void-containing layer (porous layer) may comprise only the hollow particles as the particles. That is, in such an example, the reddening-resistant layer or the void-containing layer (porous layer) may not comprise so-called solid particles. Accordingly, the desired characteristics of the reddening-resistant layer or the void-containing layer (porous layer) can be implemented more appropriately.

The reddening-resistant layer or the void-containing layer (porous layer) may comprise any additive known in the art, if necessary, in addition to the above components. Such an additive may be exemplified by hardeners or initiators for the binder, antioxidants, ultraviolet stabilizers, ultraviolet absorbers, colorants, antifoams, surfactants and/or plasticizers, and the like.

The thickness of the reddening-resistant layer or the void-containing layer (porous layer) may be controlled for expression of the desired reddening-resistance ability. For example, the reddening-resistant layer or the void-containing layer (porous layer) may have a thickness of about 200 nm or more. In this thickness range, the desired reddening-resistant ability can be effectively expressed. In another example, the thickness may also be about 250 nm or more, about 300 nm or more, about 350 nm or more, about 400 nm or more, about 450 nm or more, about 500 nm or more, about 550 nm or more, about 600 nm or more, about 650 nm or more, about 700 nm or more, about 750 nm or more, about 800 nm or more, about 850 nm or more, or about 900 nm or more or so. The upper limit of the thickness is not particularly limited. In general, the thicker the reddening-resistant layer is, the better the effect of preventing, alleviating, reducing, suppressing and/or delaying heat is improved. Therefore, the upper limit of the thickness of the reddening-resistant layer or the void-containing layer (porous layer) may be selected in consideration of the thickness required for the optical laminate, and the like, without particular limitation, as long as the effect of preventing, alleviating, reducing, suppressing and/or delaying heat is ensured. In one example, the thickness of the reddening-resistant layer or the void-containing layer (porous layer) may also be about 3,000 nm or less, about 2,900 nm or less, about 2,800 nm or less, about 2,700 nm or less, about 2,600 nm or less, about 2,500 nm or less, about 2,400 nm or less, about 2,300 nm or less, about 2,200 nm or less, about 2,100 nm or less, about 2,000 nm or less, or about 1,950 nm or less or so.

The position of the reddening-resistant layer in the optical laminate may also be controlled to ensure the desired reddening-resistant performance.

The reddening-resistant layer may be a layer included separately in the optical laminate, or may be a layer implemented by forming voids in a layer (e.g., an adhesive layer or a pressure-sensitive adhesive layer) already present in the optical laminate.

The position of the reddening-resistant layer in the optical laminate may be controlled for the purpose, i.e. prevention, alleviation, reduction, suppression and/or delay of the reddening.

For example, the reddening-resistant layer may be located as close as possible to the optical functional layer which is the main cause of the reddening in the optical laminate. That is, the distance between the reddening-resistant layer and the optical functional layer in the optical laminate can be controlled. Here, the distance may be the shortest interval, the maximum interval or the average interval between the facing surfaces of the reddening-resistant layer and the optical functional layer. In one example, the distance between the reddening-resistant layer and the optical functional layer may be within about 90 μm, within about 85 μm, within about 80 μm, within about 75 μm, within about 70 μm, within about 65 μm, within about 60 μm, within about 55 μm, within about 50 μm, within about 45 μm, within about 40 μm, within about 35 μm, within about 30 μm, within about 25 μm, within about 20 μm, within about 15 μm, within about 10 μm, within about 5 μm, within about 1 μm, within about 0.9 μm, within about 0.8 μm, within about 0.7 μm, within about 0.6 μm, within about 0.5 μm, within about 0.4 μm, within about 0.3 μm, or within about 0.2 μm. The case where the optical functional layer and the reddening-resistant layer are most closely located is the case where the two layers are in contact with each other, and in this case, the distance is 0 μm. Therefore, the lower limit of the distance is 0 μm. In another example, the distance may be about 0.01 μm or more, about 0.02 μm or more, about 0.03 μm or more, about 0.04 μm or more, about 0.05 μm or more, about 0.09 μm or more, or about 0.1 μm or more or so.

This reddening-resistant layer may be disposed at a position that does not form the outermost surface of the optical laminate. That is, the reddening-resistant layer may not be the outermost layer of the optical laminate. This positioning may be required to express the reddening-resistant characteristics of the optical laminate and/or optical functional layer.

In another example, the optical laminate comprises an additional layer together with the reddening-resistant layer and the optical functional layer, where the reddening-resistant layer may be located between the optical functional layer and the additional layer. FIG. 1 is one example of such a layer configuration, which shows the case where the additional layer (30), the reddening-resistant layer (20) and the optical functional layer (10) are sequentially formed. Here, the additional layer may be a protective film, a pressure-sensitive adhesive layer, an adhesive layer, a hard coating layer, an antireflection layer, a retardation layer or a brightness enhancement layer, and the like, or may be a cover glass to be described below, but is not limited thereto.

By such arrangement, the optical laminate of the present application may exhibit somewhat high surface reflectance. That is, the reddening-resistant layer of the present application can act to lower the reflectance in its configuration, but since such a reddening-resistant layer does not exist on the surface, the surface reflectance of the optical functional layer may be somewhat higher unless a separate antireflection layer or the like is formed. For example, the optical laminate may have reflectance of about 2% or more. Here, the reflectance may be reflectance or average reflectance for light in a visible light region, for example, any one wavelength in a range of approximately 380 nm to 780 nm, or wavelengths in a predetermined region in the range or the entire region. In another example, the reflectance may be about 2.5% or more, about 3% or more, about 3.5% or more, or about 4% or more, or may also be about 10% or less, about 9% or less, about 8% or less, about 7% or less, about 6% or less, or about 5% or less or so.

By such arrangement, the reddening phenomenon of the optical functional layer and/or the optical laminate can be effectively prevented, alleviated, reduced, suppressed and/or delayed.

The optical laminate may comprise various other layers as long as the optical laminate comprises the reddening-resistant layer and the optical functional layer.

Such a layer may be exemplified by, for example, a protective film for the optical laminate, a pressure-sensitive adhesive layer, an adhesive layer, a retardation film, a hard coating layer or a low reflection layer, and the like. The layers may also be the above-described additional layers.

As the type of the additional layer, a general configuration known in the art may be applied. For example, as the protective film, a resin film having excellent transparency, mechanical strength, thermal stability, moisture barrier properties or isotropy, and the like may be used, and an example of such a film may be exemplified by a cellulose resin film such as a TAC (triacetyl cellulose) film, a polyester film, a polyether sulfone film, a polysulfone film, a polycarbonate film, a polyamide film, a polyimide film, a polyolefin film, an acrylic film, a cyclic polyolefin film such as a norbornene resin film, a polyarylate film, a polystyrene film, a polyvinyl alcohol film, and the like. Furthermore, in addition to the protective layer in the form of a film, a cured resin layer obtained by curing a thermosetting or photocurable resin such as (meth)acrylic series, urethane series, acrylic urethane series, epoxy series or silicone series may also be applied as the protective film. Such a protective film may be formed on one side or both sides of the optical functional layer.

As the retardation film, a general material may be applied. For example, a monoaxially or biaxially stretched birefringent polymer film or an alignment film of a liquid crystal polymer or a polymerized layer of a polymerizable liquid crystal compound, and the like may be applied. The thickness of the retardation film is also not particularly limited.

The protective film or the retardation film as described above may be attached to the optical functional layer or the like by an adhesive or the like, where such a protective film or the like may be subjected to easy adhesion treatment such as corona treatment, plasma treatment, primer treatment or saponification treatment. In addition, when the protective film is attached to the optical functional layer or the reddening-resistant layer, a hard coat layer, a low reflection layer, an anti-reflection layer, an anti-sticking layer, a diffusion layer or a haze layer, and the like may be present on the side opposite to the surface of the protective film to which the optical functional layer or the reddening-resistant layer is attached.

In addition to the protective film or the retardation film, for example, various elements such as a reflective plate or a semi-transmissive plate may also be present in the optical laminate, where the kind thereof is not particularly limited.

For the adhesion of each layer in the optical laminate, an adhesive may be used. The adhesive may be exemplified by an isocyanate-based adhesive, a polyvinyl alcohol-based adhesive, a gelatin-based adhesive, vinyl series latex series or water-based polyester, and the like, but is not limited thereto. As the adhesive, a water-based adhesive may be generally used, but a solventless photocurable adhesive may also be used depending on the type of the film to be attached.

The optical laminate may comprise a pressure-sensitive adhesive layer for adhesion with other members such as a liquid crystal panel or a cover glass. A pressure-sensitive adhesive for forming the pressure-sensitive adhesive layer is not particularly limited, and for example, it may be appropriately selected from those that an acrylic polymer, a silicone-based polymer, a polyester, a polyurethane, a polyamide, a polyether, or a polymer such as fluorine series or rubber series is used as a base polymer, and used. To the exposed surface of such a pressure-sensitive adhesive layer, a release film may be temporarily attached and covered for the purpose of the contamination prevention, etc., until it is provided to practical use.

Such an optical laminate may have various forms of structures. For example, FIG. 2 is a structure in which the reddening-resistant layer (20) is introduced in the structure of the polarizing plate which is the most basic optical laminate. That is, the basic polarizing plate has a structure in which a protective film (301) is attached to at least one side of the polarizing layer (100), wherein the reddening-resistant layer (20) may be positioned between the polarizing layer (100) and the protective film (301). In the structure of FIG. 2, an adhesive or a pressure-sensitive adhesive may be used for bonding each layer (100, 20, 301). In one example, the reddening-resistant layer (20) of FIG. 2 may be a separate layer, or itself may be the adhesive or the pressure-sensitive adhesive. That is, hollow particles or the like may be introduced into the adhesive or the pressure-sensitive adhesive to form a void-containing layer (porous layer) acting as the reddening-resistant layer.

In FIG. 2, the protective film (302) is also attached to the bottom of the polarizing layer (100), that is, the surface opposite to the reddening-resistant layer (20), but this protective film (302) may be omitted or another kind of layer (for example, the retardation film or the cured resin layer, and the like, as described above) may be attached thereto. For example, a pressure-sensitive adhesive layer may be formed on the bottom of the protective film (302) present on the surface opposite to the reddening-resistant layer (20), that is, on the surface opposite to the surface of the protective film (302) toward the polarizing layer (100), or a pressure-sensitive adhesive layer may be formed instead of the protective film (302).

FIG. 3 is, as a modified structure, a case where two protective films (301, 302) exist on one side of the polarizing layer (100) and a reddening-resistant layer (20) exists between the protective films (301, 302). In this case, a pressure-sensitive adhesive or an adhesive may be applied to the adhesion of the layer, where the reddening-resistant layer (20) may also be the pressure-sensitive adhesive or the adhesive. In such a structure, the details of the protective film (303) existing on the bottom of the polarizing layer (100) are the same as those of the protective film (302) existing on the bottom of the polarizing layer (100) in the structure of FIG. 2.

FIGS. 2 and 3 are one example of the present application, where the optical laminate of the present application may be composed of various structures in addition to these.

The present application also relates to a display device comprising the optical laminate. The type of the display device may vary without particular limitation, which may be, for example, a known LCD (liquid crystal display) or OLED (organic light emitting display), and the like, and in such a display device, the optical laminate may be applied by a conventional method.

In particular, the optical laminate is effectively applied to a display device comprising a so-called cover glass.

Such a device typically comprises a cover glass and an optical laminate attached to the cover glass by a so-called OCA (optical clear adhesive) or OCR (optical clear resin), and the like, where the laminate of the present application may be applied as the optical laminate. Accordingly, the display device comprises a cover glass and an optical laminate attached to the cover glass, wherein the optical laminate may comprise: the optical functional layer; and a reddening-resistant layer formed on at least one side of the optical functional layer, where the reddening-resistant layer may be located between the cover glass and the optical functional layer.

In general, a display device comprising a cover glass is applied to applications such as vehicle navigation, where the reddening phenomenon is more problematic due to the cover glass having a high thermal conductivity.

However, the optical laminate of the present application can be applied to the device of the above structure to solve the above problem.

The specific structure of the display device is not particularly limited as long as the optical laminate of the present application is applied, which may follow a known structure.

Advantageous Effects

The present application can provide an optical laminate that does not cause a so-called reddening phenomenon even when driven or maintained under extremely harsh conditions (e.g., very high temperature conditions), or a reddening-resistant layer applied thereto.

MODE FOR INVENTION

Figure 1:
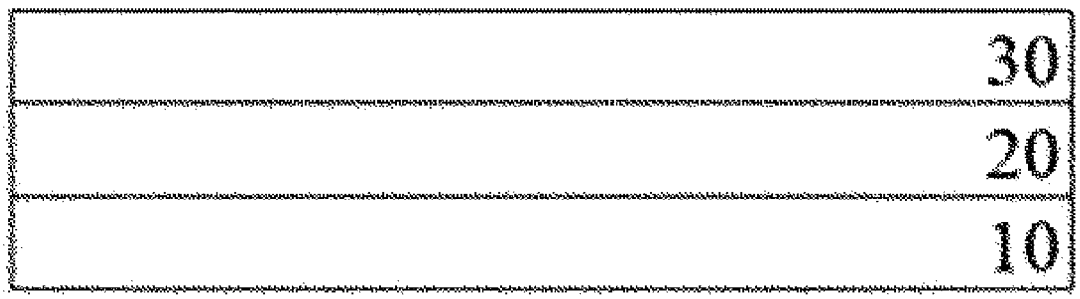
FIGS. 1 to 3 are diagrams for explaining exemplary structures of optical laminates of the present application.
Figure 2:
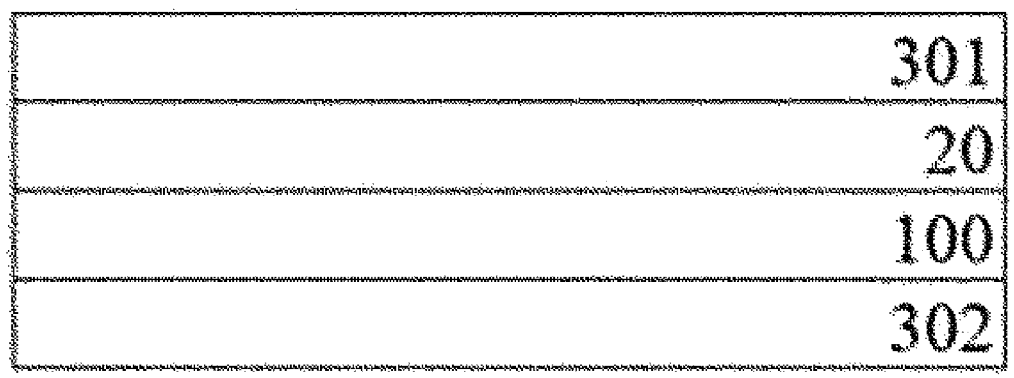
Figure 3:

Hereinafter, the polarizing layer and the like will be described in more detail with reference to examples according to the present application, and the like, but the scope of the present application is not limited thereto.

Hereinafter, the physical properties herein were measured in the following manners.
1. Measurement of Thickness The thicknesses of the polarizing layer and the reddening-resistant layer, and the like can be measured by applying a TEM (transmission electron microscopy) instrument. After photographing the cross-section of the polarizing layer or the reddening-resistant layer with the TEM instrument, the thickness of the relevant layer can be confirmed from the photographed image. In this example, Hitachi's H-7650 product was used as the TEM instrument.
2. Measurement of Particle Size Distribution and Pore Size of Hollow Particles The particle size distribution of the hollow particles was measured using Otsuka Electronics' ELSZ-2000 equipment. In addition, the particle diameters and pore sizes of the hollow particles were measured by applying a TEM (transmission electron microscopy) instrument. In this example, Hitachi's H-7650 product was used as the TEM instrument. The particle diameters and pore sizes were obtained, respectively, by optionally selecting 50 hollow particles after photographing (10000 times magnification) the cross-section of the reddening-resistant layer in each optical laminate (polarizing plate) produced in Examples and the like using the TEM instrument, and the arithmetic means were taken as representative values of the particle diameter and pore size.
3. CIE Color Coordinate Measurement Color coordinates were measured using a JASCO V-7100 spectrophotometer. The JASCO V-7100 spectrophotometer is an instrument that after rotating the absorption axis of the measurement target polarizing plate from 0 degrees to 360 degrees with respect to the absorption axis of the polarizer built into the relevant instrument to measure the color coordinates (TD color coordinates) at the point where the transmittance is minimum and rotating the absorption axis of the measurement target polarizing plate 90 degrees clockwise again at the point where the transmittance is minimum to measure the color coordinates (MD color coordinates), the representative values of the color coordinates are derived based on the respective measured values. Color coordinates described in Examples of this specification are color coordinates that are confirmed by the JASCO V-7100 spectrophotometer.
4. Measurement of Transmittance The single transmittance of the polarizing plate, and the like were measured using a JASCO V-7100 spectrophotometer. The JASCO V-7100 spectrophotometer is an instrument that the transmittance of the polarizing plate, and the like are measured in a range of 380 to 780 nm to derive representative values for the wavelength range, and in this example, the transmittance identified on the JASCO V-7100 spectrophotometer has been described.
5. Measurement of Weight Ratio of Potassium (K) and Zinc (Zn) in Polarizing Layer The weight ratio of potassium (K) and zinc (Zn) present in the polarizing layer was measured in the following manner. First, 0.1 g or so of the polarizing layer was dissolved in an aqueous solution of nitric acid (2 mL) at a concentration of about 65 weight % at room temperature (about 25° C.), followed by diluting it to 40 mL with deionized water, and then the weights of potassium (K) and zinc (Zn) contained in the polarizing layer were measured, respectively, using ICP-OES (Optima 5300).

6. Thermal Diffusivity Evaluation of Reddening-Resistant Layer

The thermal diffusivity of the reddening-resistant layer was measured in the following manner. The thermal diffusivity was evaluated in a state where the reddening-resistant layer was formed on a TAC (triacetyl cellulose) film (manufactured by Hyosung, PG601F) having a thickness of approximately 60 μm or so in the manner described in the following examples. At this time, the thickness of the reddening-resistant layer is described in each example. Graphite coating was performed on the top and bottom of the laminate of the TAC film/reddening-resistant layer. The graphite coating was formed using CRAMLIN's GRAPHITE product. The product was a product that could be graphite-coated by a spray method, and the relevant product was sprayed on the top (surface of the reddening-resistant layer) and the bottom (TAC film) of the laminate once or so, and then dried to form a graphite layer. Thereafter, the thermal diffusivity was measured using NETZSCH's LFA 457 MicroFlash product. The thermal diffusivity was measured based on a temperature of 95° C., which was confirmed through the temperature transfer from one graphite surface to the other graphite surface. In such a manner, the thermal diffusivity of the laminate (reddening-resistant layer/TAC film) was evaluated, and in each example, the relative ratio of the thermal diffusivity of the laminate relative to the TAC film was described.

7. Infrared Reflectance Evaluation of Reddening-Resistant Layer

The infrared reflectance of the reddening-resistant layer was confirmed by the following method. The infrared reflectance was evaluated in a state where a reddening-resistant layer was formed on a TAC (triacetyl cellulose) film having a thickness of approximately 60 μm or so in the manner described in the following examples. At this time, the thickness of the reddening-resistant layer is described in each example. A black tape (TOMOEGAWA, PET film) was attached to the bottom (the surface of the film on which the reddening-resistant layer was not formed) of the TAC film in the laminate of the reddening-resistant layer/TAC film to perform darkening treatment, and the average reflectance in a wavelength region of 800 to 1300 nm was measured in the reflectance mode using SHIMADZU's Solidspec 3700 equipment. If the instrument was used, the reflectance for the wavelength range at intervals of 1 nm could be confirmed in the range of 800 nm to 1300 nm, and in this example, the arithmetic mean value of the reflectance for each wavelength was taken as the representative value of the infrared reflectance.

8. Small Angle X Ray Scattering (SAXS) Evaluation of Reddening-Resistant Layer

The small angle X-ray scattering evaluation of the reddening-resistant layer was performed in the following manner. The evaluation was performed in a state where the reddening-resistant layer was formed on a TAC (triacetyl cellulose) film having a thickness of approximately 60 μm or so in the manner described in the following examples. At this time, the thickness of the reddening-resistant layer is described in each example. A test specimen is manufactured by cutting the laminate of the TAC film/reddening-resistant layer so that the width and length are each about 1 cm or so. The reddening-resistant layer of the test specimen was irradiated with X-rays having a wavelength of 0.0733 nm at a distance of 4 m apart to obtain scattering intensity according to the scattering vector. The measurement was performed on a Pohang accelerator 4 C beamline, and X-rays having a vertical size of 0.023 mm or so and a horizontal size of 0.3 mm or so were used. 2D mar CCD was used as a detector. After the scattered 2D diffraction pattern image was obtained, it was calibrated using the sample-to-detector distance obtained through the standard sample (polyethylene-block-polybutadiene-block-polystyrene, SEBS), and the scattering intensity according to the scattering vector (q) was converted through the circular average. At this time, the scattering vector was obtained according to the following equation A.

$$q = 4\pi \sin \theta / \lambda \quad \text{[Equation A]}$$

In Equation A, q is the scattering vector, θ is a value ½ times the scattering angle (unit:degree), and λ is the wavelength of the irradiated X-rays (unit: angstrom (Å)).

9. Cauchy Parameter Measurement

The refractive index and Cauchy parameter of the reddening-resistant layer were performed in the following manner. The evaluation was performed in a state where the reddening-resistant layer was formed on a TAC (triacetyl cellulose) film having a thickness of approximately 60 μm or so in the manner described in the following examples. At this time, the thickness of the reddening-resistant layer is described in each example. For the reddening-resistant layer of the laminate (reddening-resistant layer/TAC film), the characteristics were evaluated using the equipment (J. A. Woollam Co. M-2000). For the reddening-resistant layer, linearly polarized light was measured in a wavelength range of 380 nm to 1,000 nm at an incident angle of 70 degrees by applying the equipment. The measured linearly polarized light data (ellipsometry data (Psi (Ψ), delta (Δ)) were subjected to fitting by using the Complete EASE software so that the MSE of the Cauchy model of Equation 1 below was 25 or less, and n (λ), A, B and C of Equation 6 below were obtained. In the fitting process, the Roughness function was applied with on (range of −20~50 nm).

$$n(\lambda) = A + \frac{B}{\lambda^2} + \frac{C}{\lambda^4} \quad \text{[Equation 6]}$$

In Equation 6, n (λ) is the refractive index at a wavelength of 2 nm.

10. Evaluation of Surface Area Ratio

The surface area ratio of the reddening-resistant layer (void-containing layer (porous layer)) was measured using an AFM instrument (atomic force microscope, Park Systems, XE7). A sample manufactured by cutting a laminate having a reddening-resistant layer (void-containing layer (porous layer)) formed on one side of a TAC film so that the width and length are 1 cm, as described in examples, was fixed on the stage of the instrument using a carbon tape, and the measurement was performed. As a probe (tip) for the measurement, PPP-NCHR 10 (Force Constant: 42 N/m, Resonance Frequency 330 kHz) was used. Measurement conditions are as follows.

<Measurement Conditions>
x-scan size: 1 μm
y-scan size: 1 μm
Scan rate: 0.7 to 1 Hz Z Servo Gain: 1
Set Point: 10 to 15 nm
Data measured under these conditions were flattened under the following conditions using the XEI program.
<Flattening Conditions>
Scope: Line
Orientation: X and Y axis
Regression Order: 1
After flattening, the surface area ratio was extracted from the Region tab in the XEI program.

Production Example 1. Production of Polarizing Layer (A)

A PVA (poly(vinyl alcohol)) film (Japan Synthetic Co., Ltd., M3004L) having a thickness of about 30 µm was immersed in a dye solution at 28° C. containing 0.2 weight % of iodine ($I_2$) and 2.5 weight % of potassium iodide (KI) for 60 seconds and subjected to dyeing. Subsequently, the dyed PVA film was immersed in an aqueous solution at 35° C. (crosslinking solution) containing 1 weight % of boron and 3 weight % of potassium iodide (KI) for 60 seconds and subjected to crosslinking. Thereafter, the crosslinked PVA film was stretched at a draw ratio of 5.4 times using an inter-roll stretching method. The stretched PVA film was immersed in ion-exchanged water at 25° C. for 60 seconds and washed, and immersed in an aqueous solution at 25° C. containing 2 weight % of zinc nitrate and 5 weight % of potassium iodide (KI) for 30 seconds. Thereafter, the PVA film was dried at a temperature of 80° C. for 60 seconds to produce a PVA polarizing layer. The final thickness of the produced polarizing layer was about 12 µm or so, the potassium content was about 0.9 weight %, and the zinc content was about 0.3 weight %. In addition, $1/(1+0.025 d/R)$ was about 0.9. Here, d is the thickness of the polarizing layer (12 µm), and R is the ratio (K/Zn) of the weight ratio (K, unit:weight) of the potassium component contained in the polarizing layer and the weight ratio (Zn, unit:weight) of the zinc component.

Production Example 2. Production of Polarizing Layer (B)

A polarizing layer was produced using a PVA (poly(vinyl alcohol)) film (Nippon Synthetic Co., Ltd., M4504L) having a thickness of about 45 µm as a disc film. First, swelling treatment was performed on the disc film. The swelling treatment was performed by immersing the disc film in pure water at a temperature of 25° C. for 30 seconds. Stretching was performed so as to be stretched up to about 28% of the final draw ratio in the swelling treatment process. Subsequently, it was subjected to dyeing treatment using a dye solution in which iodine ($I_2$) and potassium iodide (KI) were dissolved in concentrations of about 0.2 weight % and about 2.5 weight % or so, respectively. The dyeing treatment was performed by immersing the disc film in the dye solution at 28° C. for about 2 minutes. In this process, the stretching was performed so as to be stretched up to about 40% or so of the final draw ratio. Thereafter, the dyed PVA film was immersed in an aqueous solution (crosslinking solution) at 35° C. containing 1 weight % of boron and 3 weight % of potassium iodide for 60 seconds and subjected to crosslinking. Subsequently, the disc film was stretched. The stretching was performed in an aqueous solution (treatment solution) containing boric acid and potassium iodide in concentrations of about 3 weight % or so, respectively. The temperature of the treatment solution was about 50° C. or so. Subsequently, the stretched film was washed with an aqueous solution. At this time, the temperature of the aqueous solution was about 25° C. or so, and the washing treatment was performed within 1 minute. Thereafter, the film was dried to produce a PVA polarizing layer (thickness: 27 µm, total draw ratio: 5.4 times).

Production Example 3. Production of Reddening-Resistant Layer (A) Material

A reddening-resistant layer was produced by applying TMPTA (trimethylolpropane triacrylate) as a binder and applying hollow silica particles. As the hollow silica particles, particles having D10, D50 and D90 particle diameters of 32.1 nm, 62.6 nm and 123.4 nm, respectively, were used. In this case, after forming the reddening-resistant layer, the average of the pore sizes measured by TEM was approximately 38.3 nm or so, and the particle diameter was approximately 53 nm or so. The binder, the hollow silica particles, a fluorine-containing compound (RS-90, DIC) and an initiator (Irgacure 127, Ciba) were diluted in MIBK (methyl isobutyl ketone) as a solvent in a weight ratio of 31:65:0.1:3.9 (binder:hollow silica particles:fluorine-containing compound:initiator) based on the solid content to prepare a coating solution.

Production Example 4. Production of Reddening-Resistant Layer (B) Material

A reddening-resistant layer was produced by applying TMPTA (trimethylolpropane triacrylate) as a binder and applying hollow silica particles. As the hollow silica particles, particles having D10, D50 and D90 particle diameters of 39.9 nm, 70.6 nm and 126.0 nm, respectively, were used. In this case, after forming the reddening-resistant layer, the average of the pore sizes measured by TEM was approximately 44.1 nm or so, and the particle diameter was approximately 61 nm or so. The binder, the hollow silica particles, a fluorine-containing compound (RS-90, DIC) and an initiator (Irgacure 127, Ciba) were diluted in MIBK (methyl isobutyl ketone) as a solvent in a weight ratio of 55.1:40:1.1:3.8 (binder:hollow silica particles:fluorine-containing compound:initiator) to prepare a coating solution.

Production Example 5. Production of Reddening-Resistant Layer (C) Material

A reddening-resistant layer was produced by applying PETA (pentaerythritol triacrylate) as a binder and applying hollow silica particles. As the hollow silica particles, particles having D10, D50 and D90 particle diameters of 39.9 nm, 70.6 nm and 126.0 nm, respectively, were used. In this case, after forming the reddening-resistant layer, the average of the pore sizes measured by TEM was approximately 44.1 nm or so, and the particle diameter was approximately 61 nm or so. The binder, the hollow silica particles, a fluorine-containing compound (RS-90, DIC) and an initiator (Irgacure 127, Ciba) were diluted in MIBK (methyl isobutyl ketone) as a solvent in a weight ratio of 76.5:20:0.5:3.0 (binder:hollow silica particles:fluorine-containing compound:initiator) to prepare a coating solution.

Production Example 6. Production of Reddening-Resistant Layer (D) Material

A reddening-resistant layer was produced by applying PETA (pentaerythritol triacrylate) as a binder and applying hollow silica particles. As the hollow silica particles, particles having D10, D50 and D90 particle diameters of 39.9 nm, 70.6 nm and 126.0 nm, respectively, were used. In this case, after forming the reddening-resistant layer, the average of the pore sizes measured by TEM was approximately 44.1 nm or so, and the particle diameter was approximately 61 nm or so. The binder, the hollow silica particles, a fluorine-containing compound (RS-90, DIC) and an initiator (Irgacure 127, Ciba) were diluted in MIBK (methyl isobutyl ketone) as a solvent in a weight ratio of 86.5:10:0.5:3.0 (binder:hollow silica particles:fluorine-containing compound:initiator) to prepare a coating solution.

Production Example 7. Production of Resin Layer (A) Material

A resin layer material was produced by applying PETA (pentaerythritol triacrylate) as a binder and applying solid silica particles instead of hollow silica particles. As the solid silica particles, particles having D10, D50 and D90 particle diameters of 43.1 nm, 69.9 nm and 125.8 nm, respectively, were used. In this case, after forming the resin layer, the particle diameter measured by TEM was approximately 60 nm or so. The binder, the solid silica particles, a fluorine-containing compound (RS-90, DIC) and an initiator (Irgacure 127, Ciba) were diluted in MIBK (methyl isobutyl ketone) as a solvent in a weight ratio of 31:65:0.1:3.9 (binder:solid silica particles:fluorine-containing compound:initiator) to prepare a coating solution.

Example 1

A reddening-resistant layer (void-containing layer) was formed on a TAC (triacetyl cellulose) film (Hyosung, PG601F) having a thickness of approximately 60 μm or so. The reddening-resistant layer was formed by coating the reddening-resistant layer (A) material of Production Example 3 with a Mayer bar thereon, drying it at 60° C. or so for 1 minute or so, and then irradiating it with ultraviolet rays (252 mJ/cm$^2$) to have a final thickness of about 450 nm or so. The surface area ratio measured for the surface opposite to the surface of the formed reddening-resistant layer in contact with the TAC film was in a level of about 0.148.

Example 2

A reddening-resistant layer was formed by coating the coating solution of Production Example 4 on the same TAC film as that of Example 1 using a Mayer bar, drying it at 60° C. for 1 minute, and then irradiating it with ultraviolet rays (252 mJ/cm$^2$) to have a final thickness of 600 nm. The surface area ratio measured for the surface opposite to the surface of the formed reddening-resistant layer in contact with the TAC film was in a level of about 0.0359.

Example 3

A reddening-resistant layer (void-containing layer) was formed in the same manner as in Example 1 using the coating material of Production Example 5, but the reddening-resistant layer was formed to have a final thickness of approximately 950 nm or so. The surface area ratio measured for the surface opposite to the surface of the formed reddening-resistant layer in contact with the TAC film was in a level of about 0.109.

Example 4

A reddening-resistant layer was produced in the same manner as in Example 1, except that the thickness of the void-containing layer was changed to about 300 nm or so. The surface area ratio measured on the surface opposite to the surface of the formed reddening-resistant layer in contact with the TAC film was in a level of about 0.0715.

Example 5

A reddening-resistant layer was produced in the same manner as in Example 1, except that the thickness of the void-containing layer was changed to about 400 nm or so. The surface area ratio measured for the surface opposite to the surface of the formed reddening-resistant layer in contact with the TAC film was in a level of about 0.1643.

Example 6

A reddening-resistant layer was produced in the same manner as in Example 1, except that the reddening-resistant layer (void-containing layer) having a thickness of about 500 nm was formed by applying the coating material of the reddening-resistant layer of Production Example 5. The surface area ratio measured for the surface opposite to the surface of the formed reddening-resistant layer in contact with the TAC film was in a level of about 0.2207.

Example 7

A reddening-resistant layer was produced in the same manner as in Example 6, except that the coating material for the reddening-resistant layer of Production Example 4 was applied. The surface area ratio measured on the surface opposite to the surface of the formed reddening-resistant layer in contact with the TAC film was in a level of about 0.0387.

Example 8

A reddening-resistant layer was produced in the same manner as in Example 6, except that the coating material for the reddening-resistant layer of Production Example 3 was applied. The surface area ratio measured for the surface opposite to the surface of the formed reddening-resistant layer in contact with the TAC film was in a level of about 0.0513.

Example 9

A reddening-resistant layer was produced in the same manner as in Example 6, except that the void-containing layer having a thickness of about 3000 nm was formed by applying the material of Production Example 6. The surface area ratio measured for the surface opposite to the surface of the formed reddening-resistant layer in contact with the TAC film was in a level of about 0.0611.

Comparative Example 1

A resin layer was formed on a TAC (triacetyl cellulose) film (Hyosung, PG601F) having a thickness of approximately 60 μm or so. The resin layer was formed by coating the resin layer (A) material of Production Example 7 with a Mayer bar, drying it at 60° C. or so for 1 minute or so, and then irradiating it with ultraviolet rays (252 mJ/cm$^2$) to have a final thickness of about 450 nm or so. The surface area ratio measured on the surface opposite to the surface of the formed resin layer in contact with the TAC film was in a level of about 0.01.

The characteristics of the reddening-resistant layer and the resin layer formed in each of the above examples were summarized and described in Table 1 below.

TABLE 1

| | Reddening-resistant layer | | | | | |
|---|---|---|---|---|---|---|
| | Cauchy Parameter coefficient | | | IR Reflectance (%) | Scattering vector (nm$^{-1}$) | Thermal diffusivity relative ratio |
| | A | B | C | | | |
| Example 1 | 1.331 | 0.00287 | 0.000101 | 3.34 | 0.132 | 60% |
| 2 | 1.335 | 0.00363 | 0.000244 | 3.76 | 0.128 | 62% |
| 3 | 1.332 | 0 | 0.000347 | 2.71 | 0.13 | 63% |
| 4 | 1.333 | 0.000485 | 0.00025979 | 3.51 | 0.122 | 64% |
| 5 | 1.332 | 0.00172 | 0.000301 | 3.4 | 0.123 | 60% |
| 6 | 1.453 | 0.00319 | 0.000339 | 4.4 | 0.1 | 67% |
| 7 | 1.401 | 0.00485 | 0.000025979 | 3.58 | 0.126 | 67% |
| 8 | 1.315 | 0.000258 | 0.0000134 | 2.85 | 0.141 | 60% |
| 9 | 1.489 | 0.000104 | 0.0000804 | 4.1 | 0.184 | 88% |
| Comparative Example 1 | 1.515 | 0.000864 | 0.0000151 | 1.8 | 0.211 | 92% |

IR Reflectance: Infrared reflectance
Scattering vector: Scattering vector in which a peak is identified on a log value graph of scattering intensity of small angle X-ray scattering
Thermal diffusivity: Relative ratio of thermal diffusivity of reddening-resistant layer/TAC film laminate to thermal diffusivity of TAC film at 95° C.

Example 10

A cop (cycloolefin polymer) film (manufacturer: Zeon) having a thickness of approximately 30 μm or so as a protective film was attached to the polarizing layer (A) obtained in Production Example 1 by applying a general optical water-based adhesive layer (thickness: 100 nm). The void-containing layer of the reddening-resistant layer of Example 1 was attached to the polarizing layer (A) in the laminate of the COP film and the polarizing layer (A) as produced above with the same water-based adhesive agent (thickness: 100 nm). Subsequently, an acrylic pressure-sensitive adhesive layer was formed on the bottom of the polarizing plate to produce a polarizing plate (optical laminate) having a structure in which the protective film (COP film), the adhesive layer, the polarizing layer, the adhesive layer, the reddening-resistant layer (void-containing layer), the protective film (TAC film) and the pressure-sensitive adhesive layer were sequentially laminated.

Example 11

A polarizing plate was produced in the same manner as in Example 10, except that the reddening-resistant layer produced in Example 2 was applied.

Example 12

A polarizing plate was produced in the same manner as in Example 10, except that the reddening-resistant layer produced in Example 3 was applied.

Comparative Example 2

A polarizing plate was produced in the same manner as in Example 10, except that the reddening-resistant layer was not applied.

Example 13

A polarizing plate was produced in the same manner as in Example 10, except that the reddening-resistant layer produced in Example 4 was applied.

Example 14

A polarizing plate was produced in the same manner as in Example 10, except that the reddening-resistant layer produced in Example 5 was applied.

Comparative Example 3

A polarizing plate was produced in the same manner as in Example 13, except that the reddening-resistant layer was not applied.

Example 15

A polarizing plate was produced in the same manner as in Example 10, except that the reddening-resistant layer produced in Example 6 was applied.

Example 16

A polarizing plate was produced in the same manner as in Example 15, except that the reddening-resistant layer produced in Example 7 was applied.

Example 17

A polarizing plate was produced in the same manner as in Example 15, except that the reddening-resistant layer produced in Example 8 was applied.

Example 18

A polarizing plate was produced in the same manner as in Example 15, except that the reddening-resistant layer produced in Example 9 was applied.

Comparative Example 4

A COP (cycloolefin polymer) film (manufacturer: Zeon) having a thickness of approximately 30 μm or so as a protective film was attached to the polarizing layer (A) obtained in Production Example 1 by applying a general optical water-based adhesive layer (thickness: 100 nm). The resin layer of Comparative Example 1 was attached to the polarizing layer (A) in the laminate of the COP film and the polarizing layer (A) as produced above with the same water-based adhesive agent (thickness: 100 nm) as above. Subsequently, an acrylic pressure-sensitive adhesive layer was formed on the bottom of the polarizing plate to produce a polarizing plate (optical laminate) having a structure in which the protective film (COP film), the adhesive layer, the polarizing layer, the adhesive layer, the resin layer, the protective film (TAC film) and the pressure-sensitive adhesive layer were sequentially laminated.

After the heat-proof test was performed for optical laminates (polarizing plates) in Examples and Comparative Examples above, the single transmittance and color coordinate a* change amount were evaluated and the results were summarized and described in Table 2 below. Here, the heat-proof test was performed by contacting the top and bottom whole surfaces of the polarizing plate produced in each of Examples or Comparative Examples with soda lime glass (SEWON TECH) having a thickness of about 1.1 mm or so and laminating them, and then maintaining the resultant at 105° C. for 250 hours. In addition, after observing whether or not the reddening phenomenon was confirmed with the naked eye, the results were summarized as NG in the case that it was confirmed and PASS in the case that it was not confirmed, and described in Table 2 below (in Table 2 below, the unit of transmittance is %).

TABLE 2

| | | Initial | | Holding at 105° C. for 250 hours | | | | |
|---|---|---|---|---|---|---|---|---|
| | | Transmittance | a* | Transmittance | a* | Naked eye | Transmittance change amount | a* change amount |
| Example | 10 | 41.3 | −1.47 | 40 | −0.87 | PASS | −1.3 | 0.6 |
| | 11 | 41.5 | −2.05 | 40.6 | −1.95 | PASS | −0.9 | 0.1 |
| | 12 | 41.3 | −1.66 | 40.5 | −1.56 | PASS | −0.8 | 0.1 |
| | 13 | 41.5 | −3.1 | 41.2 | −1.9 | PASS | −0.3 | 1.2 |
| | 14 | 41.6 | −3.4 | 40.6 | −2.4 | PASS | −1 | 1 |
| | 15 | 41.4 | −1.88 | 41.8 | −2 | PASS | 0.4 | −0.12 |
| | 16 | 41.1 | −2.01 | 41.5 | −2.03 | PASS | 0.4 | −0.02 |
| | 17 | 40.7 | −1.93 | 41.9 | −2.08 | PASS | 1.2 | −0.15 |
| | 18 | 41.3 | −1.94 | 42 | −2.14 | PASS | 0.7 | −0.2 |
| Comparative Example | 2 | 41.8 | −1.8 | 31.8 | 2 | NG | −10 | 3.8 |
| | 3 | 41.3 | −3.4 | 31.3 | 3.2 | NG | −10 | 6.6 |
| | 4 | 41.7 | −2.7 | 32.9 | 2.5 | NG | −8.8 | 5.2 |

The invention claimed is:

1. A reddening-resistant layer that is a void-containing layer or that comprises the void-containing layer,
   wherein the void-containing layer has reflectance of 2% or more with respect to light having a wavelength of from 800 nm to 1,300 nm,
   wherein the void-containing layer comprises a binder and hollow particles,
   wherein the binder comprises a polymer derived from a polyfunctional acrylate having 2 to 10 polymerizable functional groups, and
   wherein the hollow particles have a D10 particle diameter in a range from 25 to 50 nm, a D50 particle diameter in a range from 50 to 95 nm and a D90 particle diameter in a range from 100 nm to 200 nm in a weight cumulative curve of particle size distribution.

2. The reddening-resistant layer according to claim 1, wherein a diameter of voids in the void-containing layer is from 0.5 nm to 100 nm.

3. The reddening-resistant layer according to claim 1, wherein the void-containing layer satisfies Equation 4:

$$H_L \leq 0.9 \times H_P \quad \text{[Equation 4]}$$

wherein $H_L$ is a thermal diffusivity of a laminate of a polymer film and the reddening-resistant layer formed on one side of the polymer film, and $H_P$ is the thermal diffusivity of the polymer film.

4. The reddening-resistant layer according to claim 1, wherein the void-containing layer comprises a surface having a surface area ratio of 0.02 or more as measured by an atomic force microscope.

5. The reddening-resistant layer according to claim 1, wherein the void-containing layer exhibits at least one peak within a scattering vector range of 0.06 to 0.209 nm$^{-1}$ in a log value graph of scattering intensity of small angle X-ray scattering.

6. The reddening-resistant layer according to claim 1, wherein an A value satisfying Equation 6 of the void-containing layer is 1.5 or less, a B value satisfying Equation 6 of the void-containing layer is from 0 to 0.01 and a C value satisfying Equation 6 of the void-containing layer is from 0 to 0.001:

$$n(\lambda) = A + \frac{B}{\lambda^2} + \frac{C}{\lambda^4} \quad \text{[Equation 6]}$$

wherein $n(\lambda)$ is the refractive index of the void-containing layer at a wavelength of $\lambda$, and $\lambda$ is any one wavelength in a range of 300 to 1800 nm.

7. The reddening-resistant layer according to claim 1, wherein the void-containing layer does not comprise solid particles.

8. The reddening-resistant layer according to claim 1, wherein the void-containing layer has a thickness of 200 nm or more.

9. An optical laminate, comprising:
   an optical functional layer; and
   the reddening-resistant layer of claim 1 formed on at least one side of the optical functional layer.

10. A display device, comprising:
    a cover glass and
    an optical laminate attached to the cover glass,
    wherein the optical laminate comprises an optical functional layer and the reddening-resistant layer of claim 1 formed on at least one side of the optical functional layer.

11. The optical laminate of claim 9, wherein the reddening-resistant layer exists adjacent to an optical functional layer and the distance between the reddening-resistant layer and the optical functional layer is 90 µm or less.

12. The optical laminate of claim 11, wherein the optical functional layer is an iodine-based polarizing layer.

* * * * *